United States Patent
Arzelier et al.

(10) Patent No.: US 11,395,233 B2
(45) Date of Patent: Jul. 19, 2022

(54) CONTROL OF UPLINK DATA TRANSMISSION

(71) Applicant: BlackBerry Limited, Waterloo (CA)

(72) Inventors: Claude Jean-Frederic Arzelier, Molieres-sur-Ceze (FR); Stephen John Barrett, Haywards Heath (GB); Rene Faurie, Versailles (FR); Karen Lynn Bachman, Fuquay-Varina, NC (US)

(73) Assignee: BlackBerry Limited, Waterloo (CA)

( * ) Notice: Subject to any disclaimer, the term of this patent is extended or adjusted under 35 U.S.C. 154(b) by 0 days.

(21) Appl. No.: 17/074,465

(22) Filed: Oct. 19, 2020

(65) Prior Publication Data
US 2021/0037475 A1 Feb. 4, 2021

Related U.S. Application Data

(63) Continuation of application No. 16/529,605, filed on Aug. 1, 2019, now Pat. No. 10,834,677, which is a (Continued)

(51) Int. Cl.
*H04B 1/38* (2015.01)
*H04W 52/02* (2009.01)
(Continued)

(52) U.S. Cl.
CPC ....... *H04W 52/0277* (2013.01); *H04W 4/027* (2013.01); *H04W 28/0268* (2013.01);
(Continued)

(58) Field of Classification Search
CPC ............ H04W 28/0268; H04W 4/027; H04W 52/0241; H04W 52/0277; H04W 72/0413;
(Continued)

(56) References Cited

U.S. PATENT DOCUMENTS

| 10,834,677 B2 | 11/2020 | Arzelier et al. |
| 2007/0173283 A1 | 7/2007 | Livet et al. |

(Continued)

FOREIGN PATENT DOCUMENTS

| CN | 102802243 | 11/2012 |
| CN | 103314634 | 9/2013 |

(Continued)

OTHER PUBLICATIONS

CN Office Action issued in Chinese Appln. No 201880016108.6, dated Sep. 27, 2021, 23 pages (With English Translation).
(Continued)

*Primary Examiner* — Xin Jia
(74) *Attorney, Agent, or Firm* — Fish & Richardson P.C.

(57) ABSTRACT

A method for control of data transmission in a wireless communication system includes receiving, by an application, from a modem, information indicative of a radio coverage condition, where a user equipment (UE) includes the application and the modem; based on the received information, determining that the UE is in an enhanced coverage state; and in response to the determining, controlling uplink data transmission by the modem to reduce power consumption of the UE.

20 Claims, 29 Drawing Sheets

Related U.S. Application Data continuation of application No. 16/119,044, filed on Aug. 31, 2018, now Pat. No. 10,405,279, which is a continuation of application No. 15/419,321, filed on Jan. 30, 2017, now Pat. No. 10,070,393.

(51) Int. Cl.
  *H04W 4/02* (2018.01)
  *H04W 28/02* (2009.01)
  *H04W 72/04* (2009.01)

(52) U.S. Cl.
  CPC ... *H04W 52/0241* (2013.01); *H04W 72/0413* (2013.01); *Y02D 30/70* (2020.08)

(58) Field of Classification Search
  CPC ........ Y02D 70/00; Y02D 70/10; Y02D 70/12; Y02D 70/1224; Y02D 70/1226; Y02D 70/1242; Y02D 70/126; Y02D 70/1262; Y02D 70/1264; Y02D 70/142; Y02D 70/146; Y02D 70/164; Y02D 70/21; Y02D 70/26; Y02D 30/70
  See application file for complete search history.

(56) References Cited

U.S. PATENT DOCUMENTS

| | | | |
|---|---|---|---|
| 2015/0043445 | A1 | 2/2015 | Xiong et al. |
| 2016/0192296 | A1 | 6/2016 | Rehau et al. |
| 2016/0226639 | A1* | 8/2016 | Xiong .................. H04L 5/0053 |
| 2016/0353327 | A1* | 12/2016 | Larsson ................ H04W 4/029 |
| 2017/0026942 | A1 | 1/2017 | Srinivasan |
| 2017/0099682 | A1* | 4/2017 | Priyanto ............... H04W 24/08 |
| 2017/0181009 | A1* | 6/2017 | Wong ........................ H04L 1/08 |
| 2017/0245265 | A1* | 8/2017 | Hwang ................. H04L 5/0055 |
| 2017/0338877 | A1* | 11/2017 | Yum .................... H04B 7/0626 |
| 2019/0357147 | A1 | 8/2019 | Arzelier et al. |

FOREIGN PATENT DOCUMENTS

| | | |
|---|---|---|
| CN | 104798428 | 7/2015 |
| CN | 105052044 | 11/2015 |
| CN | 105792339 | 7/2016 |
| CN | 105848258 | 8/2016 |
| EP | 2579522 | 10/2013 |
| KR | 20080109719 | 12/2008 |
| KR | 20110094489 | 8/2011 |
| KR | 20130037190 | 4/2013 |
| WO | 2000048327 | 8/2000 |
| WO | 2014075270 | 5/2014 |
| WO | 2016070423 | 5/2016 |
| WO | 2016172174 | 10/2016 |

OTHER PUBLICATIONS

3GPP TS 23.682, "3rd Generation Partnership Project; Technical Specification Group Sendees and System Aspects; Architecture enhancements to facilitate communications with packet data networks and applications (Release 13)," 3GPP TS 23.682 V13.8.0, Dec. 2016, 93 pages.
3GPP TS 24.008, "3rd Generation Partnership Project; Technical Specification Group Core Network and Terminals; Mobile radio interface Laver 3 specification; Core network protocols; Stage 3 (Release 13)," 3GPP TS 24.008 V13.8.0, Dec. 2016, 761 pages.
3GPP TS 24.301. "3rd Generation Partnership Project; Technical Specification Group Core Network and Terminals; Non-Access-Stratum (NAS) protocol for Evolved Packet System (EPS); Stage 3 (Release 13)," 3GPP TS 24.301 V13.8.0, Dec. 2016, 464 pages.
3GPP TS 27.007, "3rd Generation Partnership Project; Technical Specification Group Core Network and Terminals; AT command set for User Equipment (UE) (Release 14)," 3GPP TS 27.007 V14.2.0, Dec. 2016, 344 pages.
3GPP TS 31.102, "3rd Generation Partnership Project; Technical Specification Group Core Network and Terminals; Characteristics of the Universal Subscriber Identity Module (USIM) application (Release 13)," 3GPP TS 31.102 V13.6.0, Jan. 2017, 276 pages.
3GPP TS 31.111, "3rd Generation Partnership Project; Technical Specification Group Core Network and Terminals; Universal Subscriber Identity Module (USIM) Application Toolkit (USAT) (Release 13)," 3GPP TS 31.111 V13.5.0, Jan. 2017, 137 pages.
3GPP TS 36.300. "3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 13)," 3GPP TS 36.300 V13.6.0, Dec. 2016, 314 pages.
3GPP TS 36.321, "3rd Generation Partnership Project; Technical Specification Group Radio Access Network; Evolved Universal Terrestrial Radio Access (E-UTRA); Medium Access Control (MAC) protocol specification (Release 13)," 3GPP TS 36.321 V13.4.0, Dec. 2016, 93 pages.
3GPP TS 36.331, "3rd Generation Partnership Project; Technical Specification Group Radio Access Network; Evolved Universal Terrestrial Radio Access (E-UTRA); Radio Resource Control (RRC); Protocol specification (Release 13)," 3GPP TS 36.331 V13.4.0, Dec. 2016, 629 pages.
3GPP TS 43.064, "3rd Generation Partnership Project; Technical Specification Group GSM/EDGE Radio Access Network; General Packet Radio Service (GPRS); Overall description of the GPRS radio interface; Stage 2 (Release 13)," 3GPP TS 43.064 V13.2.0, May 2016, 117 pages.
3GPP TS 44.018, "3rd Generation Partnership Project; Technical Specification Group Radio Access Network: Mobile radio interface layer 3 specification; GSM/EDGE Radio Resource Control (RRC) protocol (Release 13)," 3GPP TS 44.018 V13.4.0, Dec. 2016, 534 pages.
3GPP TS 44.060, "3rd Generation Partnership Project; Technical Specification Group Radio Access Network; General Packet Radio Service (GPRS); Mobile Station (MS)—Base Station System (BSS) interface: Radio Link Control / Medium Access Control (RLC/MAC) protocol (Release 13)," 3GPP TS 44.060 V13.4.0, Dec. 2016, 210 pages.
3GPP TSG RAN Meeting #70, RP-152284, "Work Item on Narrowband IoT," Huawei, HiSilicon, Sitges, Spain, Dec. 7-10, 2015, 11 pages.
3GPP TSG RAN WG2 Meeting #96, R2-167426/S2-166286, "Response LS on Enhanced Coverage authorization impact on cell and PLMN selection procedures," Reno, NV, Nov. 14-18, 2016, 2 pages.
3GPP TSG RAN WG2 Meeting #96, R2-169085, "Response LS on Enhanced Coverage authorization impact on cell and PLMN selection procedures," Reno, NV, Nov. 14-18, 2016, 2 pages.
SA WG2 Meeting #118, S2-166417, "Support of Enhanced Coverage Authorization Control via SCEF," Intel; Reno, NV; Nov. 14-18, 2016, 4 pages.
PCT International Search Report and Written Opinion in International Appln. No. PCT/EP2018/052305, dated May 11, 2018, 16 pages.
Notice of Allowance issued in United States U.S. Appl. No. 15/419,321 dated Jun. 6, 2018, 6 pages.
Non-Final Office Action issued in United States U.S. Appl. No. 16/119,044 dated Jan. 8, 2019, 9 pages.
EP Office Action issued in European Appln. No. 18702673.7 dated Nov. 6, 2019, 1 page.
KR Office Action issued in Korean Appln No. 10-20197025114, dated Aug. 10, 2021, 18 pages (With English Translation).
JP Office Action issued in Japanese Appln. No. 2019540520, dated Nov. 29, 2021, 6 pages (With English Translation).
Extended European Search Report issued in European Appln. No. 21206479.4 dated Nov. 29, 2021, 7 pages.
IN Examination Report issued in Indian Appln. No. 201947034955, dated Jan. 5, 2022, 9 pages (With English Translation).

* cited by examiner

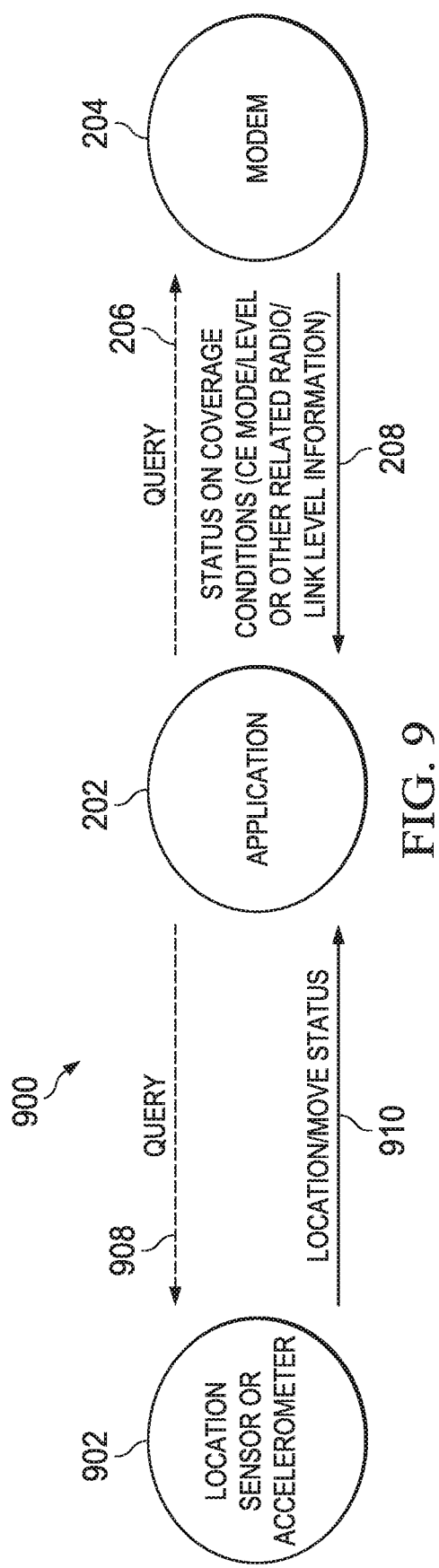
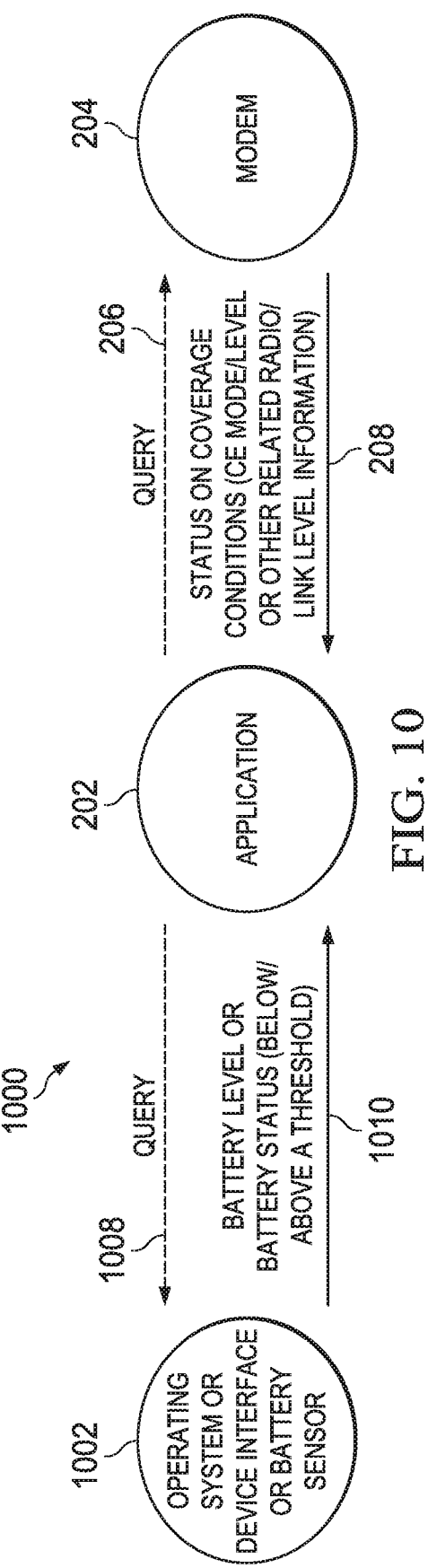
FIG. 9
FIG. 10

FIG. 14A 7.2 NETWORK REGISTRATION +CREG

TABLE 35: +CREG PARAMETER COMMAND SYNTAX

| COMMAND | POSSIBLE RESPONSE(S) |
|---|---|
| +CREG=[<n>] | +CME ERROR: <err> |
| +CREG? | +CREG: <n>, <stat>[, [<lac>], [<ci>], [<AcT>] [, <cause_type>, <reject_cause>], [<cov>], [<cov-gsm>]] |
| +CREG=? | +CREG: (LIST OF SUPPORTED <n>s) |

DESCRIPTION

SET COMMAND CONTROLS THE PRESENTATION OF AN UNSOLICITED RESULT CODE +CREG: <stat> WHEN <n>=1 AND THERE IS A CHANGE IN THE MT's CIRCUIT MODE NETWORK REGISTRATION STATUS IN GERAN/UTRAN/E-UTRAN, OR UNSOLICITED RESULT CODE +CREG: <stat>[, [<lac>], [<ci>], [<AcT>] ] WHEN <n>=2 AND THERE IS A CHANGE OF THE NETWORK CELL IN GERAN/UTRAN/E-UTRAN. THE PARAMETERS <AcT>, <lac> and <ci> ARE SENT ONLY IF AVAILABLE. THE VALUE <n>=3 FURTHER EXTENDS THE UNSOLICITED RESULT CODE WITH [, <cause_type>, <reject_cause>], WHEN AVAILABLE, WHEN THE VALUE OF <stat> CHANGES.

NOTE 1:  IF THE MT ALSO SUPPORTS GPRS SERVICES AND/OR EPS SERVICES, THE +CGREG COMMAND AND +CGREG: RESULT CODES AND/OR THE +CEREG COMMAND AND +CEREG: RESULT CODES APPLY TO THE REGISTRATION STATUS AND LOCATION INFORMATION FOR THOSE SERVICES.

READ COMMAND RETURNS THE STATUS OF RESULT CODE PRESENTATION AND AN INTEGER <stat> WHICH SHOWS WHETHER THE NETWORK HAS CURRENTLY INDICATED THE REGISTRATION OF THE MT. LOCATION INFORMATION ELEMENTS <lac>, <ci> and <AcT>, IF AVAILABLE, ARE RETURNED ONLY WHEN <n>=2 AND MT IS REGISTERED IN THE NETWORK. THE PARAMETERS [, <cause_type>, <reject_cause>], IF AVAILABLE, ARE RETURNED WHEN <n>=3. REFER SUBCLAUSE 9.2 FOR POSSIBLE <err> VALUES.

TEST COMMAND RETURNS VALUES SUPPORTED AS A COMPOUND VALUE.

DEFINED VALUES

<n>: INTEGER TYPE
    0  DISABLE NETWORK REGISTRATION UNSOLICITED RESULT CODE
    1  ENABLE NETWORK REGISTRATION UNSOLICITED RESULT CODE +CREG: <stat>
    2  ENABLE NETWORK REGISTRATION AND LOCATION INFORMATION UNSOLICITED RESULT CODE +CREG: <stat>[, [<lac>], [<ci>], [<AcT>] ]

FROM FIG. 14A

3 ENABLE NETWORK REGISTRATION, LOCATION INFORMATION AND CAUSE VALUE INFORMATION UNSOLICITED RESULT CODE +CREG: <stat>[, [<lac>], [<ci>], [<AcT>] [, <cause_type>, <reject_cause>] ]

<stat>: INTEGER TYPE; CIRCUIT MODE REGISTRATION STATUS
  0 NOT REGISTERED, MT IS NOT CURRENTLY SEARCHING A NEW OPERATOR TO REGISTER TO
  1 REGISTERED, HOME NETWORK
  2 NOT REGISTERED, BUT MT IS CURRENTLY SEARCHING A NEW OPERATOR TO REGISTER TO
  3 REGISTRATION DENIED
  4 UNKNOWN (e.g., OUT OF GERAN/UTRAN/E-UTRAN COVERAGE)
  5 REGISTERED, ROAMING
  6 REGISTERED FOR "SMS ONLY", HOME NETWORK (APPLICABLE ONLY WHEN <AcT> INDICATES E-UTRAN)
  7 REGISTERED FOR "SMS ONLY", ROAMING (APPLICABLE ONLY WHEN <AcT> INDICATES E-UTRAN)
  8 ATTACHED FOR EMERGENCY BEARER SERVICES ONLY (SEE NOTE 2) (NOT APPLICABLE)
  9 REGISTERED FOR "CSFB NOT PREFERRED", HOME NETWORK (APPLICABLE ONLY WHEN <AcT> INDICATES E-UTRAN)
  10 REGISTERED FOR "CSFB NOT PREFERRED", ROAMING (APPLICABLE ONLY WHEN <AcT> INDICATES E-UTRAN)

NOTE 2: 3GPP TS 24.008 [8] AND 3GPP TS 24.301 [83] SPECIFY THE CONDITION WHEN THE MS IS CONSIDERED AS ATTACHED FOR EMERGENCY BEARER SERVICES.

<lac>: STRING TYPE; TWO BYTE LOCATION AREA CODE (WHEN <AcT> INDICATES VALUE 0 TO 6), OR TRACKING AREA CODE (WHEN <AcT> INDICATES VALUE 7). IN HEXADECIMAL FORMAT (e.g. "00C3" EQUALS 195 IN DECIMAL).

<ci>: STRING TYPE; FOUR BYTE GERAN/UTRAN/E-UTRAN CELL ID IN HEXADECIMAL FORMAT.

<AcT>: INTEGER TYPE; ACCESS TECHNOLOGY OF THE SERVING CELL
  0 GSM
  1 GSM COMPACT
  2 UTRAN
  3 GSM w/EGPRS (SEE NOTE 3)
  4 UTRAN w/HSDPA (SEE NOTE 4)
  5 UTRAN w/HSUPA (SEE NOTE 4)
  6 UTRAN w/HSDPA AND HSUPA (SEE NOTE 4)

FROM FIG. 14B

7  E-UTRAN

8  EC-GSM-IoT (SEE NOTE 5)

9  NB-IoT (SEE NOTE 6)

NOTE 3:  3GPP TS 44.018 [156] SPECIFIES THE SYSTEM INFORMATION MESSAGES WHICH GIVE THE INFORMATION ABOUT WHETHER THE SERVING CELL SUPPORTS EGPRS.

NOTE 4:  3GPP TS 25.331 [74] SPECIFIES THE SYSTEM INFORMATION BLOCKS WHICH GIVE THE INFORMATION ABOUT WHETHER THE SERVING CELL SUPPORTS HSDPA OR HSUPA.

NOTE 5:  3GPP TS 44.018 [156] SPECIFIES THE EC-SCH INFORMATION MESSAGE WHICH, IF PRESENT, INDICATES THAT THE SERVING CELL SUPPORTS EC-GSM-IoT.

NOTE 6:  3GPP TS 36.331 [86] SPECIFIES THE SYSTEM INFORMATION BLOCKS WHICH GIVE THE INFORMATION ABOUT WHETHER THE SERVING CELL SUPPORTS NB-IoT.

<cause_type>: INTEGER TYPE; INDICATES THE TYPE OF <reject_cause>.

0  INDICATES THAT <reject_cause> CONTAINS AN MM CAUSE VALUE, SEE 3GPP TS 24.008 [8] ANNEX G.

1  INDICATES THAT <reject_cause> CONTAINS A MANUFACTURER SPECIFIC CAUSE.

<reject_cause>: INTEGER TYPE; CONTAINS THE CAUSE OF THE FAILED REGISTRATION. THE VALUE IS OF TYPE AS DEFINED BY <cause_type>.

<cov>: INTEGER TYPE; COVERAGE ENHANCEMENT LEVEL. APPLICABLE ONLY IF <Act>=E-UTRAN OR NB-IoT.

0  COVERAGE ENHANCEMENT (CE) LEVEL 0

1  COVERAGE ENHANCEMENT (CE) LEVEL 1

2  COVERAGE ENHANCEMENT (CE) LEVEL 2

3  COVERAGE ENHANCEMENT (CE) LEVEL 3 (NOT APPLICABLE IF <Act>=NB-IoT)

NOTE 7:    3GPP TS 36.331 [86] SPECIFIES COVERAGE ENHANCEMENT LEVELS.

<cov-gsm>: INTEGER TYPE; COVERAGE CLASS. APPLICABLE ONLY IF <Act>=EC-GSM-IoT.

0  COVERAGE CLASS CC1

1  COVERAGE CLASS CC2

2  COVERAGE CLASS CC3

3  COVERAGE CLASS CC4

4  COVERAGE CLASS CC5

NOTE 8:    3GPP TS 43.064 [13] SPECIFIES COVERAGE CLASSES.

IMPLEMENTATION

OPTIONAL.

FIG. 15A 10.1.43 SENDING OF ORIGINATING DATA VIA THE CONTROL PLANE +CSODCP

TABLE 10.1.43-1: +CSODCP ACTION COMMAND SYNTAX

| COMMAND | POSSIBLE RESPONSE(S) |
|---|---|
| +CSODCP=<cpdata_length>, <cpdata> [,<RAI> [,<type_of_user_data>, <cond>] ] | +CME ERROR: <err> |
| +CSODCP=? | +CSODCP: (MAXIMUM NUMBER OF BYTES OF THE <cpdata_length>),(LIST OF SUPPORTED <type_of_user_data>s) |

DESCRIPTION

THE SET COMMAND IS USED BY THE TE TO TRANSMIT DATA OVER CONTROL PLANE TO NETWORK VIA MT.

THIS COMMAND OPTIONALLY INDICATES THAT THE APPLICATION ON THE MT EXPECTS THAT THE EXCHANGE OF DATA:
- WILL BE COMPLETED WITH THIS UPLINK DATA TRANSFER;
OR
- WILL BE COMPLETED WITH THE NEXT RECEIVED DOWNLINK DATA.

THIS COMMAND ALSO OPTIONALLY INDICATES WHETHER OR NOT THE DATA TO BE TRANSMITTED IS AN EXCEPTION DATA.

WHEN IN E-UTRAN, THIS COMMAND CAUSES TRANSMISSION OF AN ESM DATA TRANSPORT MESSAGE, AS DEFINED IN 3GPP TS 24.301 [83].

REFER SUBCLAUSE 9.2 FOR POSSIBLE <err> VALUES.

TEST COMMAND RETURNS THE MAXIMUM NUMBER OF BYTES OF THE USER DATA CONTAINER SUPPORTED BY THE MT, SUPPORTED <RAI>s AND SUPPORTED <type_of_user_data>s AS A COMPOUND VALUE.

DEFINED VALUES

<cpdata_length>: INTEGER TYPE. INDICATES THE NUMBER OF BYTES OF THE <cpdata> INFORMATION ELEMENT. WHEN THERE IS NO DATA TO TRANSMIT, THE VALUE SHALL BE SET TO ZERO <cpdata>: STRING TYPE. CONTAINS THE USER DATA CONTAINER CONTENTS (REFER 3GPP TS 24.301 [83] SUBCLAUSE 9.9.4.24). WHEN THERE IS NO DATA TO TRANSMIT, THE <cpdata> SHALL BE AN EMPTY STRING (""). THE LENGTH OF <cpdata> IS IMPLEMENTATION SPECIFIC.

EDITOR'S NOTE: THE TYPE OF STRING FOR <cpdata> IS FFS.

<RAI>: INTEGER TYPE. INDICATES THE VALUE OF THE RELEASE ASSISTANCE INDICATION, REFER 3GPP TS 24.301 [83] SUBCLAUSE 9.9.4.25.
   0  NO INFORMATION AVAILABLE.

TO FIG. 15B

FROM FIG. 15A

1. THE MT EXPECTS THAT EXCHANGE OF DATA WILL BE COMPLETED WITH THE TRANSMISSION OF THE ESM DATA TRANSPORT MESSAGE.
2. THE MT EXPECTS THAT EXCHANGE OF DATA WILL BE COMPLETED WITH THE RECEIPT OF AN ESM DATA TRANSPORT MESSAGE.

<type_of_user_data>: INTEGER TYPE. INDICATES WHETHER THE USER DATA THAT IS TRANSMITTED IS REGULAR OR EXCEPTIONAL.

0. REGULAR DATA.
1. EXCEPTION DATA.

<cond>: INTEGER TYPE. INDICATES THE CONDITION FOR TRANSMITTING THE USER DATA.

0. TRANSMIT THE DATA
1. TRANSMIT THE DATA ONLY IF THE DEVICE IS NOT IN COVERAGE ENHANCEMENT (CE) LEVELS 1, 2, AND 3 (E-UTRAN OR NB-IoT)
   TRANSMIT THE DATA ONLY IF THE DEVICE IS NOT IN COVERAGE CLASS 2, 3 AND 4 (EC-GSM-IoT)

NOTE 7: 3GPP TS 36.331 [86] SPECIFIES COVERAGE ENHANCEMENT LEVELS. 3GPP TS 43.064 [13] SPECIFIES COVERAGE CLASSES.

IMPLEMENTATION

OPTIONAL.

FIG. 15B 10.1.x UPLINK DATA RESTRICTION SETTING +CEUDR

TABLE 10.1.34-1: +CEUDR PARAMETER COMMAND SYNTAX

| COMMAND | POSSIBLE RESPONSE(S) |
|---|---|
| +CEUDR=[<setting>] | |
| +CEUDR? | +CEUDR: <setting> |
| +CEUDR=? | +CEUDR: (LIST OF SUPPORTED<setting>s) |

DESCRIPTION

THE SET COMMAND IS USED TO SET THE MT TO OPERATE ACCORDING TO UPLINK DATA RESTRICTION.

THE READ COMMAND RETURNS THE USAGE SETTING SET BY THE TE.

THE TEST COMMAND IS USED FOR REQUESTING INFORMATION ON THE SUPPORTED MT SETTING(S).

DEFINED VALUES

<setting>: INTEGER TYPE; INDICATES THE UPLINK DATA RESTRICTION FOR THE MT. THE DEFAULT VALUE IS MANUFACTURER SPECIFIC.

0  UPLINK DATA FOR SOCKET PORT 0 ALLOWED TO BE SENT

1  UPLINK DATA FOR SOCKET PORT 0 ALLOWED TO BE SENT IF:

E-UTRAN OR NB-IoT:

- THE DEVICE IS IN COVERAGE ENHANCEMENT (CE) LEVEL 0;

OR

- THE DEVICE IS IN COVERAGE ENHANCEMENT (CE) LEVEL 1, 2 OR (APPLICABLE TO E-UTRAN ONLY) 3, AND THE DATA WAS NOT TRANSMITTED FOR THE LAST HOUR.

NOTE 1:    3GPP TS 36.331 [86] SPECIFIES COVERAGE ENHANCEMENT LEVELS.

EC-GSM-IoT:

- THE DEVICE IS IN COVERAGE CLASS CC1;

OR

- THE DEVICE IS IN COVERAGE CLASS CC2, CC3, CC4 OR (IF APPLICABLE) CC5, AND THE DATA WAS NOT TRANSMITTED FOR THE LAST HOUR.

NOTE 2:    3GPP TS 43.064 [13] SPECIFIES COVERAGE CLASSES.

IMPLEMENTATION

OPTIONAL.

```
DATA SENDING INDICATION VALUE

UPLINK DATA RESTRICTION ALLOWED (UDRA)

BITS
2 1
0 0  NO INFORMATION AVAILABLE
0 1  UPLINK DATA SENDING RESTRICTION NOT ALLOWED
1 0  UPLINK DATA SENDING RESTRICTION ALLOWED FOR A MAXIMUM
     OF ONE HOUR IF THE UE IS IN ENHANCED COVERAGE 1, 2 OR 3
1 1  UPLINK DATA SENDING RESTRICTION ALLOWED FOR A MAXIMUM
     OF TWO HOURS IF THE UE IS IN ENHANCED COVERAGE 1, 2 OR 3
```

FIG. 18A 5.5.1.3.4.2       COMBINED ATTACH SUCCESSFUL

THE DESCRIPTION FOR ATTACH FOR EPS SERVICES AS SPECIFIED IN SUBCLAUSE 5.5.1.2.4 SHALL BE FOLLOWED. IN ADDITION, THE FOLLOWING DESCRIPTION FOR ATTACH FOR NON-EPS SERVICES OR "SMS ONLY" APPLIES.

THE TMSI REALLOCATION MAY BE PART OF THE COMBINED ATTACH PROCEDURE. THE TMSI ALLOCATED IS THEN INCLUDED IN THE ATTACH ACCEPT MESSAGE, TOGETHER WITH THE LOCATION AREA IDENTIFICATION (LAI). IN THIS CASE THE MME SHALL START TIMER T3450 AS DESCRIBED IN SUBCLAUSE 5.4.1.4, AND ENTER STATE EMM-COMMON-PROCEDURE-INITIATED. IF THE MME DOES NOT INDICATE "SMS ONLY" IN THE ATTACH ACCEPT MESSAGE, SUBJECT TO OPERATOR POLICIES THE MME SHOULD ALLOCATE A TAI LIST THAT DOES NOT SPAN MORE THAN ONE LOCATION AREA.

(...)

IF THE ATTACH ACCEPT MESSAGE INCLUDES THE ADDITIONAL UPDATE RESULT IE WITH VALUE "CS FALLBACK NOT PREFERRED", THIS INDICATES TO A UE OPERATING IN CS/PS MODE 2 AND A UE OPERATING IN CS/PS MODE 1 WITH "IMS VOICE AVAILABLE" THAT IT IS ATTACHED FOR EPS AND NON-EPS SERVICES AND THAT IT CAN USE CS FALLBACK.

IF THE ATTACH ACCEPT MESSAGE INCLUDES THE DATA SENDING INDICATION IE, THIS INDICATES TO THE UE IF IT IS ALLOWED TO APPLY UPLINK DATA SENDING RESTRICTION AND FOR WHICH DURATION.

IF THE LAI CONTAINED IN THE ATTACH ACCEPT MESSAGE IS A MEMBER OF THE LIST OF "FORBIDDEN LOCATION AREAS FOR REGIONAL PROVISION OF SERVICE" OR THE LIST OF "FORBIDDEN LOCATION AREAS FOR ROAMING" THEN SUCH ENTRY SHALL BE DELETED.

FROM FIG. 18A

IF THE PLMN IDENTITY FOR THE CS DOMAIN WHICH IS PROVIDED AS PART OF THE LAI CONTAINED IN THE ATTACH ACCEPT MESSAGE DIFFERS FROM THE PLMN IDENTITY PROVIDED AS PART OF THE GUTI, THE MME SHALL INCLUDE THE PLMN IDENTITY FOR THE CS DOMAIN IN THE LIST OF EQUIVALENT PLMNs IN THE ATTACH ACCEPT MESSAGE.

(...)

8.2 EPS MOBILITY MANAGEMENT MESSAGES

8.2.1 ATTACH ACCEPT

8.2.1.1 MESSAGE DEFINITION

THIS MESSAGE IS SENT BY THE NETWORK TO THE UE TO INDICATE THAT THE CORRESPONDING ATTACH REQUEST HAS BEEN ACCEPTED. SEE TABLE 8.2.1.1.

MESSAGE TYPE:     ATTACH ACCEPT
SIGNIFICANCE:     DUAL
DIRECTION:        NETWORK TO UE

Table 8.2.1.1: ATTACH ACCEPT MESSAGE CONTENT

| IEI | INFORMATION ELEMENT | TYPE/REFERENCE | PRESENCE | FORMAT | LENGTH |
|---|---|---|---|---|---|
| | PROTOCOL DISCRIMINATOR | PROTOCOL DISCRIMINATOR 9.2 | M | V | 1/2 |
| | SECURITY HEADER TYPE | SECURITY HEADER TYPE 9.3.1 | M | V | 1/2 |
| | ATTACH ACCEPT MESSAGE IDENTITY | MESSAGE TYPE 9.8 | M | V | 1 |
| | EPS ATTACH RESULT | EPS ATTACH RESULT 9.9.3.10 | M | V | 1/2 |
| | SPARE HALF OCTET | SPARE HALF OCTET 9.9.2.9 | M | V | 1/2 |
| | T3412 VALUE | GPRS TIMER 9.9.3.16 | M | V | 1 |
| | TAI LIST | TRACKING AREA IDENTITY LIST 9.9.3.33 | M | LV | 7-97 |
| | ESM MESSAGE CONTAINER | ESM MESSAGE CONTAINER 9.9.3.15 | M | LV-E | 5-n |

FROM FIG. 18B

| 50 | GUTI | EPS MOBILE IDENTITY 9.9.3.12 | O | TLV | 13 |
|---|---|---|---|---|---|
| 13 | LOCATION AREA IDENTIFICATION | LOCATION AREA IDENTIFICATION 9.9.2.2 | O | TV | 6 |
| 23 | MS IDENTITY | MOBILE IDENTITY 9.9.2.3 | O | TLV | 7-10 |
| 53 | EMM CAUSE | EMM CAUSE 9.9.3.9 | O | TV | 2 |
| 17 | T3402 VALUE | GPRS TIMER 9.9.3.16 | O | TV | 2 |
| 59 | T3423 VALUE | GPRS TIMER 9.9.3.16 | O | TV | 2 |
| 4A | EQUIVALENT PLMNs | PLMN LIST 9.9.2.8 | O | TLV | 5-47 |
| 34 | EMERGENCY NUMBER LIST | EMERGENCY NUMBER LIST 9.9.3.37 | O | TLV | 5-50 |
| 64 | EPS NETWORK FEATURE SUPPORT | EPS NETWORK FEATURE SUPPORT 9.9.3.12A | O | TLV | 3 |
| F- | ADDITIONAL UPDATE RESULT | ADDITIONAL UPDATE RESULT 9.9.3.0A | O | TV | 1 |
| 5E | T3412 EXTENDED VALUE | GPRS TIMER 3 9.9.3.16B | O | TLV | 3 |
| 6A | T3324 VALUE | GPRS TIMER 2 9.9.3.16A | O | TLV | 3 |
| 6E | EXTENDED DRX PARAMETERS | EXTENDED DRX PARAMETERS 9.9.3.46 | O | TLV | 3 |
| x- | <u>DATA SENDING INDICATION</u> | <u>DATA SENDING INDICATION 9.9.4.29</u> | <u>O</u> | <u>TV</u> | <u>1</u> |

(...)

<u>8.2.1.15   DATA SENDING INDICATION</u>

<u>THE NETWORK MAY INCLUDE THIS IE TO INDICATE TO THE UE IF THE USE OF UPLINK DATA SENDING RESTRICTION IS ALLOWED. IF THIS IE IS NOT INCLUDED THEN THE UE SHALL INTERPRET THIS AS A RECEIPT OF AN INFORMATION ELEMENT WITH ALL BITS OF THE VALUE PART CODED AS ZERO.</u>

TO FIG. 18D

FROM FIG. 18C (...)

*9.9.4.29 DATA SENDING INDICATION*

*THE PURPOSE OF THE DATA SENDING INDICATION IE IS TO INFORM THE UE WHETHER UPLINK DATA RESTRICTION IS ALLOWED, AND IF SO FOR WHICH MAXIMUM DURATION.*

*THE DATA SENDING INDICATION INFORMATION ELEMENT IS CODED AS SHOWN IN FIGURE 9.9.4.29.1 AND TABLE 9.9.4.29.1.*

*THE DATA SENDING INDICATION IS A TYPE 1 INFORMATION ELEMENT.*

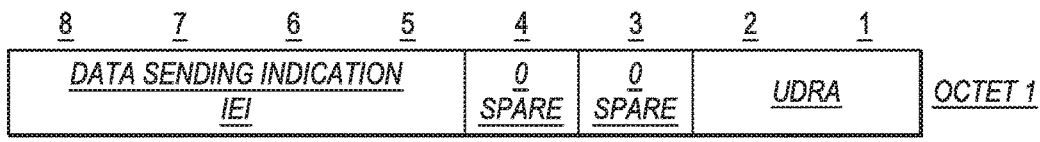

*FIGURE 9.9.4.29.1: DATA SENDING INDICATION INFORMATION ELEMENT*

*TABLE 9.9.4.29.1: DATA SENDING INDICATION INFORMATION ELEMENT*

*DATA SENDING INDICATION VALUE*

*UPLINK DATA RESTRICTION ALLOWED (UDRA)*

*BITS*
*2 1*
*0 0 NO INFORMATION AVAILABLE*
*0 1 UPLINK DATA SENDING RESTRICTION NOT ALLOWED*
*1 0 UPLINK DATA SENDING RESTRICTION ALLOWED FOR A MAXIMUM OF ONE HOUR IF THE UE IS IN ENHANCED COVERAGE 1, 2 OR 3*
*1 1 UPLINK DATA SENDING RESTRICTION ALLOWED FOR A MAXIMUM OF TWO HOURS IF THE UE IS IN ENHANCED COVERAGE 1, 2 OR 3*

*BITS 3 AND 4 OF OCTET 1 ARE SPARE AND SHALL BE ENCODED AS ZERO.*

FIG. 18D

*8.2.1.15   DATA SENDING INDICATION*

*THE NETWORK MAY INCLUDE THIS IE TO INDICATE TO THE UE IF THE USE OF UPLINK DATA SENDING RESTRICTION IS ALLOWED AND UNDER WHICH CONDITIONS. IF THIS IE IS NOT INCLUDED THEN THE UE SHALL INTERPRET THIS AS A RECEIPT OF AN INFORMATION ELEMENT WITH ALL BITS OF THE VALUE PART CODED AS ZERO.*

*(...)*

*9.9.4.29   DATA SENDING INDICATION*

*THE PURPOSE OF THE DATA SENDING INDICATION IE IS TO INFORM THE UE WHETHER UPLINK DATA RESTRICTION IS ALLOWED AND UNDER WHICH CONDITIONS.*

*THE DATA SENDING INDICATION INFORMATION ELEMENT IS CODED AS SHOWN IN FIGURE 9.9.4.29.1 AND TABLE 9.9.4.29.1.*

*THE DATA SENDING INDICATION IS A TYPE 1 INFORMATION ELEMENT.*

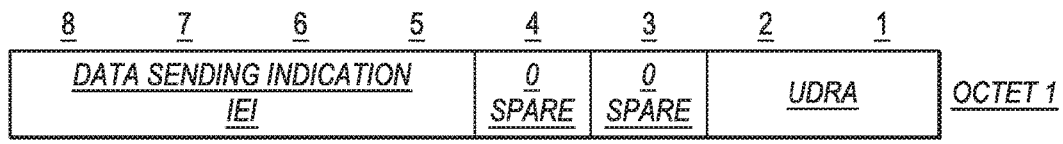

*FIGURE 9.9.4.29.1: DATA SENDING INDICATION INFORMATION ELEMENT*

*TABLE 9.9.4.29.1: DATA SENDING INDICATION INFORMATION ELEMENT*

*DATA SENDING INDICATION VALUE*

*UPLINK DATA RESTRICTION ALLOWED (UDRA)*

*BITS*
*2 1*
*0 0   NO INFORMATION AVAILABLE*
*0 1   UPLINK DATA SENDING RESTRICTION NOT ALLOWED*
*1 0   UPLINK DATA SENDING RESTRICTION ALLOWED FOR A MAXIMUM OF ONE HOUR FOR NON-EMERGENCY LOCATION INFORMATION IF THE UE IS IN ENHANCED COVERAGE 1, 2 OR 3 AND THE UE IS (MOVING OR (NOT-MOVING AND ONE MESSAGE WAS ALREADY SENT IN THIS TRACKING AREA)) AND THE UE IS NOT PLUGGED-IN AND THE BATTERY LEVEL IS ABOVE 10% AND BELOW 90%*
*1 1   SAME CONDITIONS AS '10', WITH MAXIMUM ALLOWED SENDING RESTRICTION TIME OF TWO HOURS INSTEAD OF ONE HOUR*

*BITS 3 AND 4 OF OCTET 1 ARE SPARE AND SHALL BE ENCODED AS ZERO.*

8.3.6 ACTIVATE DEFAULT EPS BEARER CONTEXT REQUEST

8.3.6.1 MESSAGE DEFINITION

THIS MESSAGE IS SENT BY THE NETWORK TO THE UE TO REQUEST ACTIVATION OF A DEFAULT EPS BEARER CONTEXT. SEE TABLE 8.3.6.1

MESSAGE TYPE:  ACTIVATE DEFAULT EPS BEARER CONTEXT REQUEST
SIGNIFICANCE:   DUAL
DIRECTION:      NETWORK TO UE

Table 8.3.6.1: ACTIVATE DEFAULT EPS BEARER CONTEXT REQUEST MESSAGE CONTENT

| IEI | INFORMATION ELEMENT | TYPE/REFERENCE | PRESENCE | FORMAT | LENGTH |
|---|---|---|---|---|---|
|  | PROTOCOL DISCRIMINATOR | PROTOCOL DISCRIMINATOR 9.2 | M | V | 1/2 |
|  | EPS BEARER IDENTITY | EPS BEARER IDENTITY 9.3.2 | M | V | 1/2 |
|  | PROCEDURE TRANSACTION IDENTITY | PROCEDURE TRANSACTION IDENTITY 9.4 | M | V | 1 |
|  | ACTIVATE DEFAULT EPS BEARER CONTEXT REQUEST MESSAGE IDENTITY | MESSAGE TYPE 9.8 | M | V | 1 |
|  | EPS QoS | EPS QUALITY OF SERVICE 9.9.4.3 | M | LV | 2-14 |
|  | ACCESS POINT NAME | ACCESS POINT NAME 9.9.4.1 | M | LV | 2-101 |
|  | PDN ADDRESS | PDN ADDRESS 9.9.4.9 | M | LV | 6-14 |
| 5D | TRANSACTION IDENTIFIER | TRANSACTION IDENTIFIER 9.9.4.17 | O | TLV | 3-4 |
| 30 | NEGOTIATED QoS | QUALITY OF SERVICE 9.9.4.12 | O | TLV | 14-22 |
| 32 | NEGOTIATED LLC SAPI | LLC SERVICE ACCESS POINT IDENTIFIER 9.9.4.7 | O | TV | 2 |
| 8- | RADIO PRIORITY | RADIO PRIORITY 9.9.4.13 | O | TV | 1 |

FROM FIG. 20A

| | | | | | |
|---|---|---|---|---|---|
| 34 | PACKET FLOW IDENTIFIER | PACKET FLOW IDENTIFIER 9.9.4.8 | O | TLV | 3 |
| 5E | APN-AMBR | APN AGGREGATE MAXIMUM BIT RATE 9.9.4.2 | O | TLV | 4-8 |
| 58 | ESM CAUSE | ESM CAUSE 9.9.4.4 | O | TV | 2 |
| 27 | PROTOCOL CONFIGURATION OPTIONS | PROTOCOL CONFIGURATION OPTIONS 9.9.4.11 | O | TLV | 3-253 |
| B- | CONNECTIVITY TYPE | CONNECTIVITY TYPE 9.9.4.2A | O | TV | 1 |
| C- | WLAN OFFLOAD INDICATION | WLAN OFFLOAD ACCEPTABILITY 9.9.4.18 | O | TV | 1 |
| 33 | NBIFOM CONTAINER | NBIFOM CONTAINER 9.9.4.19 | O | TLV | 3-257 |
| 66 | HEADER COMPRESSION CONFIGURATION | HEADER COMPRESSION CONFIGURATION 9.9.4.22 | O | TLV | 5-257 |
| 9- | CONTROL PLANE ONLY INDICATION | CONTROL PLANE ONLY INDICATION 9.9.4.23 | O | TV | 1 |
| 7B | EXTENDED PROTOCOL CONFIGURATION OPTIONS | EXTENDED PROTOCOL CONFIGURATION OPTIONS 9.9.4.26 | O | TLV-E | 4-65538 |
| 6E | SERVING PLMN RATE CONTROL | SERVING PLMN RATE CONTROL 9.9.4.28 | O | TLV | 4 |

(...)

9.9.4.11   PROTOCOL CONFIGURATION OPTIONS

SEE SUBCLAUSE 10.5.6.3 IN 3GPP TS 24.008 [13].

(...)

9.9.4.26   EXTENDED PROTOCOL CONFIGURATION OPTIONS

THE PURPOSE OF THE *EXTENDED PROTOCOL CONFIGURATION OPTIONS* INFORMATION ELEMENT IS TO:
 - TRANSFER EXTERNAL NETWORK PROTOCOL OPTIONS ASSOCIATED WITH A EPS BEARER CONTEXT ACTIVATION,

FROM FIG. 20B

AND
- TRANSFER ADDITIONAL (PROTOCOL) DATA (e.g., CONFIGURATION PARAMETERS, ERROR CODES OR MESSAGES/EVENTS) ASSOCIATED WITH AN EXTERNAL PROTOCOL OR AN APPLICATION.

THE *EXTENDED PROTOCOL CONFIGURATION OPTIONS* IS A TYPE 6 INFORMATION ELEMENT WITH A MINIMUM LENGTH OF 4 OCTETS AND A MAXIMUM LENGTH OF 65538 OCTETS.
THE *EXTENDED PROTOCOL CONFIGURATION OPTIONS* INFORMATION ELEMENT IS CODED AS SHOWN IN FIGURE 9.9.4.26.1 AND TABLE 9.9.4.26.1.

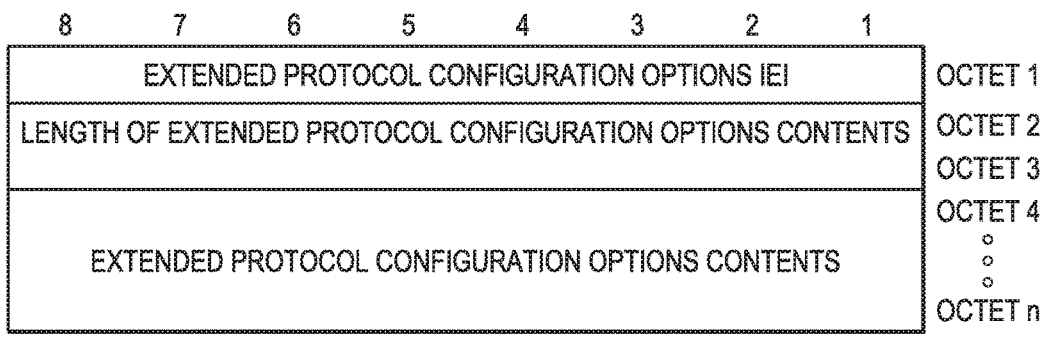

FIGURE 9.9.4.26.1: EXTENDED PROTOCOL CONFIGURATION OPTIONS INFORMATION ELEMENT

TABLE 9.9.4.29.1: EXTENDED PROTOCOL CONFIGURATION OPTIONS INFORMATION ELEMENT

| EXTENDED PROTOCOL CONFIGURATION OPTIONS CONTENTS (OCTET 4 TO OCTET n); MAX VALUE OF 65535 OCTETS |
| --- |
| THE CONTENTS OF EXTENDED PROTOCOL CONFIGURATION OPTIONS IS CODED AS OCTET 3 AND ABOVE OF PROTOCOL CONFIGURATION OPTIONS IE SHOWN IN SUBCLAUSE 10.5.6.3 IN 3GPP TS 24.008 [13]. |

3GPP TS 24.008

10.5.6.3   PROTOCOL CONFIGURATION OPTIONS 10.5.6.3.1   GENERAL

THE PURPOSE OF THE *PROTOCOL CONFIGURATION OPTIONS* INFORMATION ELEMENT IS TO:
- TRANSFER EXTERNAL NETWORK PROTOCOL OPTIONS ASSOCIATED WITH A PDP CONTEXT ACTIVATION,
AND
- TRANSFER ADDITIONAL (PROTOCOL) DATA (e.g., CONFIGURATION PARAMETERS, ERROR CODES OR MESSAGES/EVENTS) ASSOCIATED WITH AN EXTERNAL PROTOCOL OR AN APPLICATION.

FROM FIG. 20C

THE *PROTOCOL CONFIGURATION OPTIONS* IS A TYPE 4 INFORMATION ELEMENT WITH A MINIMUM LENGTH OF 3 OCTETS AND A MAXIMUM LENGTH OF 253 OCTETS.

THE *PROTOCOL CONFIGURATION OPTIONS* INFORMATION ELEMENT IS CODED AS SHOWN IN FIGURE 10.5.136/3GPP TS 24.008 AND TABLE 10.5.154/3GPP TS 24.008.

| 8 | 7 | 6 | 5 | 4 | 3 | 2 | 1 | |
|---|---|---|---|---|---|---|---|---|
| PROTOCOL CONFIGURATION OPTIONS IEI ||||||||  OCTET 1 |
| LENGTH OF PROTOCOL CONFIGURATION OPTIONS CONTENTS |||||||| OCTET 2 |
| 1 EXT | 0 | 0 | 0 | 0 | CONFIGURATION PROTOCOL ||| OCTET 3 |
| PROTOCOL ID 1 |||||||| OCTET 4 / OCTET 5 |
| LENGTH OF PROTOCOL ID 1 CONTENTS |||||||| OCTET 6 |
| PROTOCOL ID 1 CONTENTS |||||||| OCTET 7 ... OCTET m |
| PROTOCOL ID 2 |||||||| OCTET m+1 / OCTET m+2 |
| LENGTH OF PROTOCOL ID 2 CONTENTS |||||||| OCTET m+3 |
| PROTOCOL ID 2 CONTENTS |||||||| OCTET m+4 ... OCTET n |
| ○ ○ ○ |||||||| OCTET n+1 ... OCTET u |
| PROTOCOL ID n-1 |||||||| OCTET u+1 / OCTET u+2 |
| LENGTH OF PROTOCOL ID n-1 CONTENTS |||||||| OCTET u+3 |
| PROTOCOL ID n-1 CONTENTS |||||||| OCTET u+4 ... OCTET v |
| PROTOCOL ID n |||||||| OCTET v+1 / OCTET v+2 |

FROM FIG. 20D

| Field | Octets |
|---|---|
| LENGTH OF PROTOCOL ID n CONTENTS | OCTET v+3 |
| PROTOCOL ID n CONTENTS | OCTET v+4 ... OCTET w |
| CONTAINER ID 1 | OCTET w+1, OCTET w+2 |
| LENGTH OF CONTAINER ID 1 CONTENTS | OCTET w+3 |
| CONTAINER ID 1 CONTENTS | OCTET w+4 ... OCTET x |
| ○○○ | OCTET x+1 ... OCTET y |
| CONTAINER ID n | OCTET y+1, OCTET y+2 |
| LENGTH OF CONTAINER ID n CONTENTS | OCTET y+3 |
| CONTAINER ID n CONTENTS | OCTET y+4 ... OCTET z |

FIGURE 10.5.136/3GPP TS 24.008: *PROTOCOL CONFIGURATION OPTIONS* INFORMATION ELEMENT
FIGURE 10.5.154/3GPP TS 24.008: *PROTOCOL CONFIGURATION OPTIONS* INFORMATION ELEMENT

CONFIGURATION PROTOCOL (OCTET 3)
BITS
3 2 1
0 0 0   PPP FOR USE WITH IP PDP TYPE OR IP PDN TYPE (SEE 3GPP TS 24.301 [120])

ALL OTHER VALUES ARE INTERPRETED AS PPP IN THIS VERSION OF THE PROTOCOL.
AFTER OCTET 3, i.e. FROM OCTET 4 TO OCTET z, TWO LOGICAL LISTS ARE DEFINED:
-       THE CONFIGURATION PROTOCOL OPTIONS LIST (OCTETS 4 TO w),
AND

TO FIG. 20F

FROM FIG. 20E

FIG. 20F

- THE ADDITIONAL PARAMETERS LIST (OCTETS w+1 TO z).

CONFIGURATION PROTOCOL OPTIONS LIST (OCTETS 4 TO w)

THE *CONFIGURATION PROTOCOL OPTIONS LIST* CONTAINS A VARIABLE NUMBER OF LOGICAL UNITS, THEY MAY OCCUR IN AN ARBITRARY ORDER WITHIN THE *CONFIGURATION PROTOCOL OPTIONS LIST*.

EACH UNIT IS OF VARIABLE LENGTH AND CONSISTS OF A:

- PROTOCOL IDENTIFIER (2 OCTETS);
- THE LENGTH OF THE PROTOCOL IDENTIFIER CONTENTS OF THE UNIT (1 OCTET);

AND

- THE PROTOCOL IDENTIFIER CONTENTS ITSELF (n OCTETS).

THE *PROTOCOL IDENTIFIER* FIELD CONTAINS THE HEXADECIMAL CODING OF THE CONFIGURATION PROTOCOL IDENTIFIER. BIT 8 OF THE FIRST OCTET OF THE *PROTOCOL IDENTIFIER* FIELD CONTAINS THE MOST SIGNIFICANT BIT AND BIT 1 OF THE SECOND OCTET OF THE *PROTOCOL IDENTIFIER* FIELD CONTAINS THE LEAST SIGNIFICANT BIT.

IF THE *CONFIGURATION PROTOCOL OPTIONS* LIST CONTAINS A PROTOCOL IDENTIFIER THAT IS NOT SUPPORTED BY THE RECEIVING ENTITY THE CORRESPONDING UNIT SHALL BE IGNORED.

THE *LENGTH OF THE PROTOCOL IDENTIFIER CONTENTS* FIELD CONTAINS THE BINARY CODED REPRESENTATION OF THE LENGTH OF THE *PROTOCOL IDENTIFIER CONTENTS* FIELD OF A UNIT. THE FIRST BIT IN TRANSMISSION ORDER IS THE MOST SIGNIFICANT BIT.

THE *PROTOCOL IDENTIFIER CONTENTS* FIELD OF EACH UNIT CONTAINS INFORMATION SPECIFIC TO THE CONFIGURATION PROTOCOL SPECIFIED BY THE *PROTOCOL IDENTIFIER*.

AT LEAST THE FOLLOWING PROTOCOL IDENTIFIERS (AS DEFINED IN RFC 3232 [103]) SHALL BE SUPPORTED IN THIS VERSION OF THE PROTOCOL:

- C021H (LCP);
- C023H (PAP);
- C223H (CHAP);

AND

- 8021H (IPCP).

THE SUPPORT OF OTHER PROTOCOL IDENTIFIERS IS IMPLEMENTATION DEPENDENT

FROM FIG. 20E

AND OUTSIDE THE SCOPE OF THE PRESENT DOCUMENT.

THE *PROTOCOL IDENTIFIER CONTENTS* FIELD OF EACH UNIT CORRESPONDS TO A "PACKET" AS DEFINED IN RFC 1661 [102] THAT IS STRIPPED OFF THE "PROTOCOL" AND THE "PADDING" OCTETS.

THE DETAILED CODING OF THE *PROTOCOL IDENTIFIER CONTENTS* FIELD IS SPECIFIED IN THE RFC THAT IS ASSOCIATED WITH THE PROTOCOL IDENTIFIER OF THAT UNIT.

ADDITIONAL PARAMETERS LIST (OCTETS w+1 TO z)

THE *ADDITIONAL PARAMETERS LIST* IS INCLUDED WHEN SPECIAL PARAMETERS AND/OR REQUESTS (ASSOCIATED WITH A PDP CONTEXT) NEED TO BE TRANSFERRED BETWEEN THE MS AND THE NETWORK. THESE PARAMETERS AND/OR REQUESTS ARE NOT RELATED TO A SPECIFIC CONFIGURATION PROTOCOL (e.g., PPP), AND THEREFORE ARE NOT ENCODED AS THE "PACKETS" CONTAINED IN THE *CONFIGURATION PROTOCOL OPTIONS LIST*.

THE *ADDITIONAL PARAMETERS LIST* CONTAINS A LIST OF SPECIAL PARAMETERS, EACH ONE IN A SEPARATE CONTAINER. THE TYPE OF THE PARAMETER CARRIED IN A CONTAINER IS IDENTIFIED BY A SPECIFIC *CONTAINER IDENTIFIER*. IN THIS VERSION OF THE PROTOCOL, THE FOLLOWING CONTAINER IDENTIFIERS ARE SPECIFIED:

MS TO NETWORK DIRECTION:

- (...)

NETWORK TO MS DIRECTION:

- (...)
- 0016H (APN RATE CONTROL PARAMETERS); ~~AND~~
- <u>0017H (UPLINK DATA RESTRICTION INDICATION);</u>

<u>AND</u>

- FF00H TO FFFFH RESERVED FOR OPERATOR SPECIFIC USE.

(...)

<u>10.5.6.3.3   UPLINK DATA RESTRICTION INDICATION</u>

<u>THE PURPOSE OF THE *UPLINK DATA RESTRICTION INDICATION* CONTAINER CONTENTS IS TO TO INFORM THE UE IF UPLINK DATA RESTRICTION IS ALLOWED AND UNDER WHICH CONDITIONS.</u>

TO FIG. 20H

FROM FIG. 20G

THE *UPLINK DATA RESTRICTION INDICATION* CONTAINER CONTENTS ARE CODED AS SHOWN IN FIGURE 10.5.136B/3GPP TS 24.008 AND TABLE 10.5.154B/3GPP TS 24.008.

THE *UPLINK DATA RESTRICTION INDICATION* CONTAINER CONTENTS IS 1 OCTET LONG.

FIGURE 10.5.136B/3GPP TS 24.008: *UPLINK DATA RESTRICTION INDICATION* PARAMETERS

– TABLE 10.5.154B/3GPP TS 24.008: UPLINK DATA RESTRICTION INDICATION PARAMETERS

UPLINK DATA RESTRICTION ALLOWED (UDRA) (OCTET 1)

FOR EPC:
BIT
2 1
0 0 NO INFORMATION AVAILABLE
0 1 *UPLINK DATA SENDING RESTRICTION NOT ALLOWED*
1 0 *UPLINK DATA SENDING RESTRICTION ALLOWED FOR A MAXIMUM OF ONE HOUR FOR NON-EMERGENCY LOCATION INFORMATION IF THE UE IS IN ENHANCED COVERAGE 1, 2 OR 3 AND THE UE IS (MOVING OR (NOT-MOVING AND ONE MESSAGE WAS ALREADY SENT IN THIS TRACKING AREA)) AND THE UE IS NOT PLUGGED-IN AND THE BATTERY LEVEL IS ABOVE 10% AND BELOW 90%*
1 1 *SAME CONDITIONS AS '10', WITH MAXIMUM ALLOWED SENDING RESTRICTION TIME OF TWO HOURS INSTEAD OF ONE HOUR*

FOR 2G:
BIT
2 1
0 0 NO INFORMATION AVAILABLE
0 1 *UPLINK DATA SENDING RESTRICTION NOT ALLOWED*
1 0 *UPLINK DATA SENDING RESTRICTION ALLOWED FOR A MAXIMUM OF ONE HOUR FOR NON-EMERGENCY LOCATION INFORMATION IF THE UE IS IN COVERAGE CLASS 2, 3 OR 4 AND THE UE IS (MOVING OR (NOT-MOVING AND ONE MESSAGE WAS ALREADY SENT IN THIS TRACKING AREA)) AND THE UE IS NOT PLUGGED-IN AND THE BATTERY LEVEL IS ABOVE 10% AND BELOW 90%*
1 1 *SAME CONDITIONS AS '10', WITH MAXIMUM ALLOWED SENDING RESTRICTION TIME OF TWO HOURS INSTEAD OF ONE HOUR*

BITS 3 TO 8 OF OCTET 1 ARE SPARE AND SHALL BE ENCODED AS ZERO.

FIG. 20H

- *UL-DataRestrictions*

THE *UL-DataRestrictions* IE CONTAINS INFORMATION ABOUT THE CONSIDERATIONS THAT THE UE SHALL TAKE INTO ACCOUNT WHEN ADOPTING UPLINK DATA RESTRICTIONS WHILST IN DIFFERENT ENHANCED COVERAGE LEVELS. THIS IE IS CODED AS FOLLOWS:

*UL-DataRestrictions* INFORMATION ELEMENT

```
-- ASN1START

UL-DataRestrictions ::=          SEQUENCE {
    batteryLevel                 ENUMERATED{low, med, high},
    maxDelayTime                 ENUMERATED{m1, m2, m3, h1, h2, h3, spare, spare},
    allowedLogicalChannel        INTEGER (0 .. 13),
    prohibitedLogicalChannel     INTEGER (0 .. 13)
}

-- ASN1STOP
```

| *UL-DataRestrictions* FIELD DESCRIPTIONS |
|---|
| *batteryLevel* |
| THIS FIELD INDICATES THE BATTERY LEVELS AT WHICH THE UE IS ALLOWED TO ADOPT UPLINK DATA RESTRICTIONS. VALUE LOW INDICATES A LOW BATTERY LEVEL, MED INDICATES MEDIUM BATTERY LEVEL ETC. |
| *maxDelayTime* |
| INDICATES THE MAXIMUM AMOUNT OF DELAY TO WHICH THE DATA MAY BE SUBJECTED TO. VALUE m1 INDICATES 1 MINUTE, VALUE h1 INDICATES 1 HOUR ETC. |
| *allowedLogicalChannels* |
| INDICATES LOGICAL CHANNEL WHICH IS ALLOWED TO BE SUBJECTED TO UPLINK DATA RESTRICTIONS. |
| *prohibitedLogicalChannels* |
| INDICATES LOGICAL CHANNEL WHICH IS NOT ALLOWED TO BE SUBJECTED TO UPLINK DATA RESTRICTIONS |

FIG. 21

FIG. 24A 10.1.XX COVERAGE ENHANCEMENT STATUS +CIOTQCEL

TABLE 10.1.43-1: +CIOTQCEL ACTION COMMAND SYNTAX

| COMMAND | POSSIBLE RESPONSE(S) |
|---|---|
| +CIOTQCEL? | +CIOTQCEL: <AcT> [ [,<cov>] [,<cov-gsm>] ] |
| +CIOTQCEL? | +COTQCEL: (LIST OF SUPPORTED <AcT>s), (LIST OF SUPPORTED <cov>s), (LIST OF SUPPORTED <cov-gsm>s) |

DESCRIPTION

READ COMMAND RETURNS THE COVERAGE ENHANCEMENT STATUS. THE UE MAY CONSIDER THE COVERAGE ENHANCEMENT STATUS PRIOR TO DECIDING TO TRANSMIT DATA (SEE e.g., SUBCLAUSE 10.1.43).

THE COVERAGE ENHANCEMENT STATUS IS ONLY PROVIDED BY THE MT IF THE ACCESS TECHNOLOGY OF THE SERVING CELL IS E-UTRAN, EC-GSM-IoT or NB-IoT.

TEST COMMAND RETURNS THE ACCESS TECHNOLOGIES AND COVERAGE ENHANCEMENT LEVELS OR COVERAGE CLASS SUPPORTED BY THE UE AS A COMPOUND VALUE.

DEFINED VALUES

<AcT>: INTEGER TYPE; ACCESS TECHNOLOGY OF THE SERVING CELL

0  GSM
    1  GSM COMPACT
    2  UTRAN
    3  GSM w/EGPRS (SEE NOTE 3)
    4  UTRAN w/HSDPA (SEE NOTE 4)
    5  UTRAN w/HSUPA (SEE NOTE 4)
    6  UTRAN w/HSDPA AND HSUPA (SEE NOTE 4)
    7  E-UTRAN
    8  EC-GSM-IoT (SEE NOTE 5)
    9  NB-IoT (SEE NOTE 6)

NOTE 1: 3GPP TS 44.018 [156] SPECIFIES THE SYSTEM INFORMATION MESSAGES WHICH GIVE THE INFORMATION ABOUT WHETHER THE SERVING CELL SUPPORTS EGPRS.

NOTE 2: 3GPP TS 25.331 [74] SPECIFIES THE SYSTEM INFORMATION BLOCKS WHICH GIVE THE INFORMATION ABOUT WHETHER THE SERVING CELL SUPPORTS HSDPA OR HSUPA.

NOTE 3: 3GPP TS 44.018 [156] SPECIFIES THE EC-SCH INFORMATION MESSAGE WHICH, IF PRESENT, INDICATES THAT THE SERVING CELL SUPPORTS EC-GSM-IoT.

TO FIG. 24B

FROM FIG. 24A

NOTE 4: 3GPP TS 36.331 [86] SPECIFIES THE SYSTEM INFORMATION BLOCKS WHICH GIVE THE INFORMATION ABOUT WHETHER THE SERVING CELL SUPPORTS NB-IoT.

<cov>: INTEGER TYPE; COVERAGE ENHANCEMENT LEVEL. APPLICABLE ONLY IF <Act>=E-UTRAN or NB-IoT.

- 0  COVERAGE ENHANCEMENT (CE) LEVEL 0
- 1  COVERAGE ENHANCEMENT (CE) LEVEL 1
- 2  COVERAGE ENHANCEMENT (CE) LEVEL 2
- 3  COVERAGE ENHANCEMENT (CE) LEVEL 3

NOTE 5: 3GPP TS 36.331 [86] SPECIFIES COVERAGE ENHANCEMENT LEVELS.

<cov-gsm>: INTEGER TYPE; COVERAGE ENHANCEMENT LEVEL. APPLICABLE ONLY IF <Act>=EC-GSM-IoT.

- 0  COVERAGE CLASS 1
- 1  COVERAGE CLASS 2
- 2  COVERAGE CLASS 3
- 3  COVERAGE CLASS 4
- 4  COVERAGE CLASS 5

NOTE 6: 3GPP TS 43.064 [13] SPECIFY COVERAGE CLASSES.

IMPLEMENTATION

OPTIONAL.

FIG. 24B

CONTROL OF UPLINK DATA TRANSMISSION

This application is a continuation of U.S. patent application Ser. No. 16/529,605 filed on Aug. 1, 2019, which is a continuation of U.S. patent application Ser. No. 16/119,044 filed on Aug. 31, 2018, and issued as U.S. Pat. No. 10,405,279 on Sep. 3, 2019, which is a continuation of U.S. patent application Ser. No. 15/419,321 filed on Jan. 30, 2017, and issued as U.S. Pat. No. 10,070,393 on Sep. 4, 2018, the contents of which are hereby incorporated by reference.

TECHNICAL FIELD

This disclosure relates to data transmission in wireless communication systems and, more specifically, to uplink data transmission.

BACKGROUND

A wireless communication system can include an enhanced coverage functionality to extend a cell coverage area of a base station. The cell coverage area can be extended by repeated data transmissions. For example, a device in extended coverage areas can transmit data repeatedly so that the base station receives enough radio energy to detect data. In Long-Term Evolution (LTE) wireless systems, a device configured with an enhanced coverage functionality can have a maximum number of repetitions, for example, between 8 to 32 if the device is in a coverage enhancement mode A or between 192 to 2048 if the device is in a coverage enhancement mode B. However, repeated data transmissions can lead to a high power consumption at the device.

For devices whose battery can be easily or frequently recharged, benefits of using the enhanced coverage functionality to gain more coverage may offset impacts of extra battery consumption. However, for a device that cannot be recharged frequently or cannot be recharged at all, for example, an asset tracker device that can remain operational without maintenance for a number of years, battery consumption is sensitive and the extra battery consumption could outweigh the gain in coverage.

DESCRIPTION OF DRAWINGS

FIG. 9 is a second flow diagram illustrating solution 1 for controlling data transmission in enhanced coverage states according to some implementations.

FIG. 10 is a third flow diagram illustrating solution 1 for controlling data transmission in enhanced coverage states according to some implementations.

FIGS. 14A-14C show an example description of an attention (AT) command to enable solution 1 according to some implementations.

FIGS. 15A-15B show a first example description of an AT command to enable solution 2 according to some implementations.

FIG. 16 shows a second example description of an AT command to enable solution 2 according to some implementations.

FIG. 17 shows an example information element (IE) or field including configuration information for transmission restrictions according to some implementations.

FIGS. 18A-18D show a first example description of including configuration parameters for transmission restrictions in an Attach Accept message according to some implementations.

FIG. 19 shows a second example description of including configuration parameters for transmission restrictions in an Attach Accept message according to some implementations.

FIGS. 20A-20H show an example description of including configuration parameters for transmission restrictions in an Activate Default evolved packet system (EPS) Bearer Context Request message according to some implementations.

FIG. 21 shows an example radio resource control (RRC) IE including configuration information of transmission restrictions according to some implementations.

FIGS. 24A-24B show an example of a solicited AT command according to some implementations.

Like reference numbers and designations in the various drawings indicate like elements.

DETAILED DESCRIPTION

The present disclosure is directed to the control of data transmission when a device is in an enhanced coverage state. Various modifications to the disclosed implementations will be readily apparent to those of ordinary skill in the art, and described principles may be applied to other implementations and applications without departing from scope of the disclosure.

In wireless communication systems, a device can be in an enhanced coverage state if the device uses an enhanced coverage functionality to access a base station. For example, as will be discussed below, a device can be in an enhanced coverage state if the device is in certain coverage enhancement mode(s), coverage enhancement level(s), or coverage class(es), a strength or quality of a radio signal received at the device is below a threshold, or a number of repetitions for data transmission is higher than a threshold. When the device is in an enhanced coverage state, the device can control uplink data transmission to reduce power consumption. The device can refrain from sending uplink data based on information such as data type (e.g., emergency or non-emergency data), Quality of Service (QoS) associated with the data, whether the device is moving, whether a timer or counter associated with the transmission control has expired, battery level, or whether the device is plugged into a power supply. For example, when the device is in an enhanced coverage state, the device can refrain from sending uplink data if the data carries non-emergency location information or the device is not plugged into a power supply.

Figure 1:
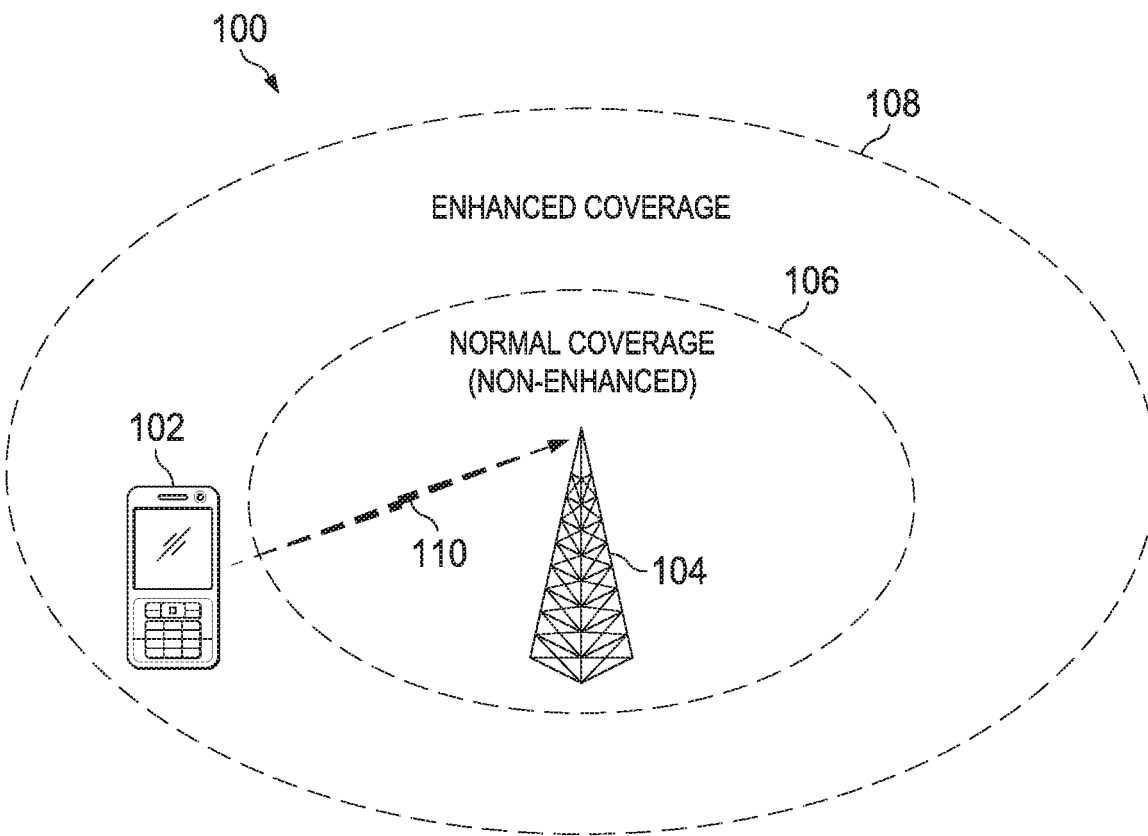
FIG. 1 is an example wireless communication system that includes controlling of data transmission in enhanced coverage states according to some implementations.

FIG. 1 is an example wireless communication system 100 that includes controlling of data transmission in enhanced coverage states according to some implementations. The example communication system 100 includes a user equipment (UE) or device 102 and a wireless network including a base station 104, where the device 102 is in the cell coverage of the base station 104. The coverage area of the base station 104 includes a normal coverage area within a normal coverage boundary 106 and an enhanced coverage area between the normal coverage boundary 106 and an enhanced coverage boundary 108. The device 102 can communicate with the base station 104 using an enhanced coverage functionality. For example, when transmitting data 110 to the base station 104, the device 102 can use a higher number of repetitions in the enhanced coverage area than in the normal coverage area.

In Long-Term Evolution (LTE) wireless systems, the enhanced coverage functionality (see 3GPP TS 36.300) includes the following:

In radio resource control (RRC) idle mode (RRC_IDLE), four coverage enhancement (CE) levels 0, 1, 2 and 3 are defined for physical random access channel (PRACH) resource selection.

In RRC connected mode (RRC_CONNECTED), two enhanced CE modes, mode A (low/medium coverage) and mode B (extreme coverage), are supported for transmitting data to the base station.

A set of PRACH resources (e.g. time, frequency, preamble), each associated with a given CE level, is provided in system information blocks (SIBs). The number of PRACH repetitions and the number of maximum preamble transmission attempts per CE level are also provided in SIBs. The initial CE level may be provided in SIBs and indicates the initial PRACH CE level to be used at random access by UEs in that cell. If not provided, the UE selects the PRACH CE level based on the measured reference signal received power (RSRP) level compared to RSRP thresholds provided in SIBs (see 3GPP TS 36.321). The CE mode to be used by a UE in enhanced coverage is provided when the UE is entering connected mode, typically in the RRCConnectionReconfiguration or the RRCConnectionResume message. Information about the number of repetitions to be used for a given signal or on a given channel are either provided in SIBs (per CE mode), as part of downlink control information (DCI), or in a dedicated message when the UE is entering the connected mode. For example, the maximum number of repetitions that can be configured by the network for a physical uplink shared channel (PUSCH) are between 8 and 32 for CE mode A and between 192 and 2048 for CE mode B. In other words, Mode B provides further enhanced coverage than Mode A, requiring higher repetitions numbers and therefore higher battery consumption.

An enhanced coverage functionality can also be defined for narrow band Internet of Things (NB-IoT) UEs and is characterized by different CE levels and different repetition levels that can be configured by the network. For example, up to 3 narrowband PRACH (NPRACH) resources can be configured in a cell, defined by at most two RSRP thresholds. The different NPRACH resources are mapped to corresponding CE levels. The network may indicate an initial number of PRACH repetitions to be used by the UE, or the starting CE level can be provided by upper layers, in which case the UE considers itself to be in the corresponding CE level regardless of the measured RSRP. The maximum number of repetitions for a given channel is configured by the network.

An enhanced coverage functionality is also an inherent part of the extended coverage GSM for Internet of Things (EC-GSM-IoT) (see 3GPP TS 43.064), including up to five coverage classes (CCs), CC1, CC2, CC3, CC4, and, if applicable, CC5, where CC1 corresponds to a typical general packet radio service (GPRS)/enhanced GPRS (EGPRS) coverage range. In an idle mode, the EC-GSM-IoT mobile station (MS) selects the CC to be used and indicates the selected CC to the network, while in Packet Transfer Mode, the network performs CC selection and communicates the CC to the MS. A predefined number of logical channel specific blind physical layer transmissions is used to support a certain level of extended coverage.

In some cases, when the device is in an idle mode, the UE autonomously decides on the radio coverage level (if the UE supports the enhanced coverage functionality) based on radio measurement criteria. When the device enters a connected mode, the network configures which enhanced coverage mode or repetition level the UE shall use based on radio measurements sent by the device and/or on other considerations. For UEs supporting the enhanced coverage functionality, it is possible for the network to decide that the UE shall not use the enhanced coverage feature based on subscription information (for example the possibility to use enhanced coverage may be allowed only for premium subscription users) or for other reasons.

In the described approach, an application can receive from a modem information indicative of a radio coverage condition, where a user equipment (UE) includes the application and the modem. Based on the received information, the application can determine that the UE is in an enhanced coverage state. In response to the determining, the application can control uplink data transmission by the modem to reduce power consumption of the UE. The received information can include at least one of a coverage enhancement level, a coverage enhancement mode, a coverage class, a data repetition indicator, a signal strength, or a signal quality. Controlling uplink data transmission can include refraining from sending uplink data when at least one of the following occurs: the UE is in one of a set of predefined coverage enhancement levels, coverage classes, or coverage enhancement modes, the data repetition indicator is above a predefined repetition threshold, a signal strength at the UE is below a predefined signal strength threshold, or a signal quality at the UE is below a predefined signal quality threshold; the uplink data has a predefined data type; the uplink data is associated with at least one of a predefined Quality of Service (QoS) indicator, a predefined priority level, or a predefined bit rate information; a predefined timer associated with the transmission controlling has not expired;

a counter associated with the transmission controlling has reached a predefined counter threshold; the UE is moving; a battery level of the UE is higher than a first threshold; a battery level of the UE is lower than a second threshold; or the UE is not plugged into a power outlet.

In some implementations, the application can receive speed information from a location sensor or an accelerometer of the UE. Based on the speed information, the application can determine whether the UE is moving. The speed information can be received responsive to a query sent by the application to the location sensor or the accelerometer. In some implementations, the application can receive battery information from an operating system, a device interface, or a battery sensor of the UE. Based on the battery information, the application can determine whether the battery level of the UE is higher than the first threshold or lower than the second threshold, or whether the UE is plugged into a power outlet. The battery information can be received responsive to a query sent by the application to the operating system, the device interface, or the battery sensor. The UE can receive from a network node configuration information including an indication that the UE is configured to control uplink data transmission and parameters associated with controlling the uplink data transmission. In some implementations, the application can receive information indicative of a radio coverage condition responsive to a query sent by the application to the modem. The query from the application to the modem for information indicative of a radio coverage condition can be conveyed in a first attention (AT) command. The information indicative of a radio coverage condition from the modem to the application can be conveyed in a second AT command. In some cases, the application receives from the modem information indicative of the radio coverage condition when the radio coverage condition changes.

The data transmission control in enhanced coverage states according to methods and systems described herein can reduce a device's power consumption when the device is in an enhanced coverage state. FIGS. 2-24 and associated descriptions provide additional details for these implementations.

Turning to a general description of the elements, a UE (or device) 102 may be referred to but is not limited to as an IoT device, machine-to-machine (M2M) device, machine type communication (MTC) device, mobile electronic device, user device, mobile station, subscriber station, portable electronic device, mobile communications device, wireless modem, push-to-talk (PTT) dispatch console, or wireless terminal. Examples of a UE may include but are not limited to a cellular phone, personal data assistant (PDA), smart phone, PTT dispatch console, laptop, tablet personal computer (PC), pager, portable computer, portable gaming device, wearable electronic device, test equipment, gambling machine, car/vehicle, notice board, home appliance, M2M/IoT electronic modules, or other mobile communications device having components for communicating voice or data via a wireless communication network. The wireless communication network may include a wireless link over at least one of a licensed spectrum and an unlicensed spectrum.

Other examples of a UE include mobile and fixed electronic devices. A UE may include a Mobile Equipment (ME) device and a removable memory module, such as a Universal Integrated Circuit Card (UICC) that includes a subscriber identity module (SIM), a Universal SIM (USIM), or a Removable User Identity Module (R-UIM). The term "UE" can also refer to any hardware or software component that can terminate a communication session for a user. In addition, the terms "user equipment," "UE," "user equipment device," "user agent," "UA," "user device," "mobile station," "MS," "mobile device," and "module" can be used synonymously herein.

The wireless communication network may include one or a plurality of radio access networks (RANs), other access networks such as fixed Ethernet or IEEE 802.11 WLAN, core networks (CNs), and external networks. The RANs may include one or more radio access technologies. In some implementations, the radio access technologies may be but are not limited to global system for mobile communication (GSM), EC-GSM-IoT, Interim Standard 95 (IS-95), Universal Mobile Telecommunications System (UMTS), CDMA2000 (Code Division Multiple Access), Evolved UMTS, LTE, LTE-Advanced, New Radio (NR), or NB-IoT. In some instances, the core networks may be evolved packet cores (EPCs) or next generation cores (NG Cores).

A RAN is part of a wireless telecommunication system which implements a radio access technology, such as GSM, UMTS, CDMA2000, 3GPP LTE, 3GPP LTE-Advanced (LTE-A), NB-IoT, and EC-GSM-IoT. In many applications, a RAN includes at least one base station. A base station (e.g., the base station 104) may be a radio base station that may control all or at least some radio-related functions in a fixed part of the system. The base station may provide radio interface within its coverage area or a cell for a UE to communicate. The base station or plurality of base stations may constitute the cellular network to provide a wide area of coverage. The base station directly or indirectly communicates with one or a plurality of UEs, other base stations, and one or more core network nodes.

While elements of FIG. 1 are shown as including various component parts, portions, or modules that implement the various features and functionality, nevertheless these elements may instead include a number of sub-modules, third-party services, components, libraries, and such, as appropriate. Furthermore, the features and functionality of various components can be combined into fewer components as appropriate. The described approach may be implemented using other methods or elements consistent with the scope of this disclosure. Although in some of the description in this disclosure LTE and GSM are used as an example, as will be understood by those of ordinary skill in the art, the described approach can also be used for other wireless communication systems and radio access technologies (RATs), such as 3GPP UMTS terrestrial radio access network (UTRAN), IEEE (e.g. 11.x, WiFi, WiMax), CDMA2000, and fifth generation (5G). In this disclosure, "uplink message," "uplink data," and "uplink data transmission" are used as general terms for any user plane type of information that would encompass one or more message(s), a structured or unstructured data stream, or any other equivalent terminology. Further, coverage enhancement level is interchangeable with enhanced coverage level, and coverage enhancement mode is interchangeable with enhanced coverage mode. In addition, in some implementations, various steps of flow diagrams and flowcharts in FIGS. 2-13 may be run in parallel, in combination, in loops, or in any order.

Figure 2:
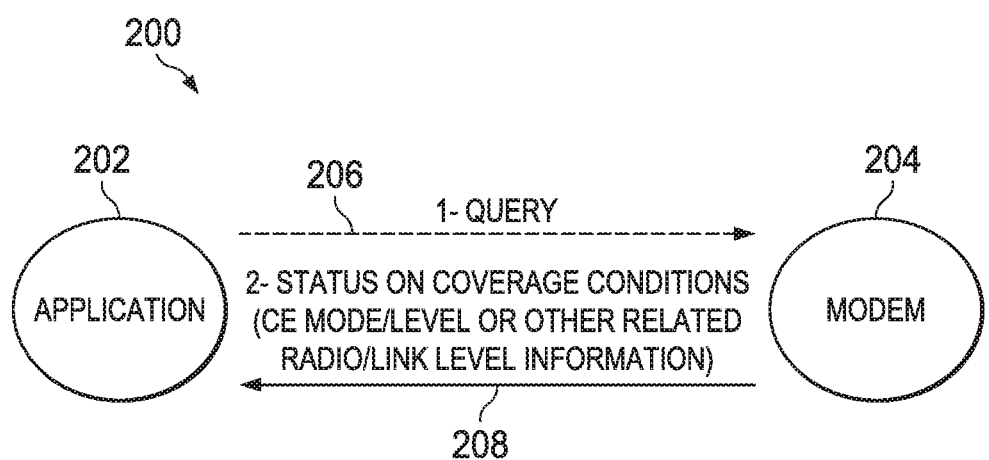
FIG. 2 is a first flow diagram illustrating solution 1 for controlling data transmission in enhanced coverage states according to some implementations.

Solution 1: Refraining from mobile-originated data transmission if the device is in an enhanced coverage state: application obtains information and decides whether to refrain from data transmission FIG. 2 is a first flow diagram 200 illustrating solution 1 for controlling data transmission in enhanced coverage states according to some implementations. The flow diagram 200 includes an application 202 and a modem 204 at a device. The application 202 determines (or is configured so, as will be discussed below) that the device can refrain from transmitting uplink data to the network if the device is in an enhanced coverage state. The data refrained from transmission could either be dropped or discarded (e.g., location information that would become obsolete after a time duration), or be retained and sent later (e.g. when the restriction on uplink data transmission is revoked). The modem 204 has knowledge of the radio coverage condition for the device (e.g., the currently applicable CE mode/level or coverage class, radio signal strength or quality such as received signal strength indicator (RSSI), received signal code power (RSCP), or RSRP, a number of repetitions for data transmission, or other radio link information). The application 202 can send a query 206 to the modem 204 for information or status of the radio coverage condition. Based on the status report 208 from the modem 204, the application 202 determines whether to send uplink data or not. The application can apply any conditions for transmission restrictions. For example, the application 202 may decide not to send data if a device CE level/mode or coverage class is one in a set of predefined CE levels/modes or coverage classes, if a number of data repetitions is above a predefined repetition threshold, a signal strength at the device is below a predefined signal strength threshold, or a signal quality at the device is below a predefined signal quality threshold. For instance, the application 202 can decide not to transmit uplink data if the device/modem is in the enhanced coverage level 1, 2, or 3.

In some implementations, the query 206 and status report 208 can be an attention (AT) command and response (see 3GPP TS 27.007), respectively. The AT commands and responses enable sending information or instructions between application (i.e. terminal equipment (TE)) and modem (i.e. Mobile Terminal (MT)), through a terminal adaptor (TA). Responses can be triggered following AT commands (one response to each received AT command), or unsolicited (e.g., activated and/or configured by an AT command; multiple responses can be sent corresponding to that AT command, and a response is sent every time the information at the modem changes or other conditions, that may have been configured by the AT command, are satisfied at the modem). In some cases, AT responses are also called AT commands. The query 206 and status report 208 can also use other application programming interfaces (APIs) instead of AT command/response.

Table 1 lists examples of query 206 from the application 202 to the modem 204, and examples of associated reported status 208 from the modem 204 to the application 202:

TABLE 1

Examples of query from application to modem

| Example queries from application to modem | Possible reported status from modem to application |
|---|---|
| Provide the enhanced coverage level | Enhanced coverage level is 0<br>Enhanced coverage level is 1<br>Enhanced coverage level is 2<br>Enhanced coverage level is 3 |
| Is the enhanced coverage level above 2? | Yes<br>No |
| Is the RSSI of the serving cell above 3 dB? | Yes<br>No |
| Provide the RSSI of the Primary Serving Cell | RSSI = −1 dB<br>RSSI = 1 dB<br>RSSI = 3 dB<br>RSSI = 5 dB<br>RSSI = 7 dB |

TABLE 1-continued

Examples of query from application to modem

| Example queries from application to modem | Possible reported status from modem to application |
|---|---|
| Provide a status every time that the enhanced coverage level changes | Enhanced coverage level has changed to 0<br>Enhanced coverage level has changed to 1<br>Enhanced coverage level has changed to 2<br>Enhanced coverage level has changed to 3 |
| Provide a status every time that the enhanced coverage level goes between (0, 1) and (2, 3) | Enhanced coverage level changed from (2, 3) to (0, 1)<br>Enhanced coverage level changed from (0, 1) to (2, 3) |

Note that for the last two examples in Table 1, one query may trigger more than one status report because the modem 204 sends a status report every time the enhanced coverage level changes. In some implementations, the query 206 is optional for these two examples. For example, as will be discussed below, the application 202 can use an AT command to subscribe or register to the modem 204 for receiving notifications of enhanced coverage level change, and the modem 204 will send unsolicited status reports to the application 202 every time the enhanced coverage level changes. Alternatively, sending unsolicited notifications by the modem 204 to the application 202 can be pre-configured in the modem.

In some implementations, a device in an enhanced coverage state is a device conforming to, for example (but not limited to), one or more of the following criteria:

The device is in enhanced coverage mode A or mode B for LTE UEs, the currently selected CE level is part of an identified set of possible CE levels, or the currently selected coverage class is part of an identified set of possible coverage classes. Since for LTE UEs enhanced coverage mode B allows transmission in more degraded coverage than mode A but at the price of higher power consumption, the device could decide to not transmit one or more uplink message if the device is in mode B, but transmit the message when possible if the device is in mode A.

A link budget or radio link power/quality (e.g. based on a RSSI, RSCP, or RSRP) is below an identified threshold. This criterion allows to specify a consistent behavior irrespective of the device category (e.g., NB-IoT and non NB-IoT UEs).

A number of repetitions, possibly associated to a given channel type (e.g. a PRACH or MTC PRACH (MPRACH) repetitions number configured by the network), is above a predefined threshold.

In some implementations, the modem 204 generates an event triggered AT command to notify the application 202 that a change in enhanced coverage status has been detected (any change, or one or more specific change(s)). The application 202 is able to use an AT command to subscribe or register to receiving such notifications from the modem 204. If the modem 204, in the course of operation, has detected such changes in enhanced coverage, it would be useful for the application 202 to be informed. The application 202 can store the latest enhanced coverage status for the UE. This might at a later stage prevent the application 202 from inquiring the modem 204 for the coverage information. Note that there is a power cost in the modem for obtaining the enhanced coverage status. In the event the application decides not to send data (e.g., a low priority packet) because of the poor coverage, the power for obtaining the enhanced coverage status is wasted.

Figure 3:
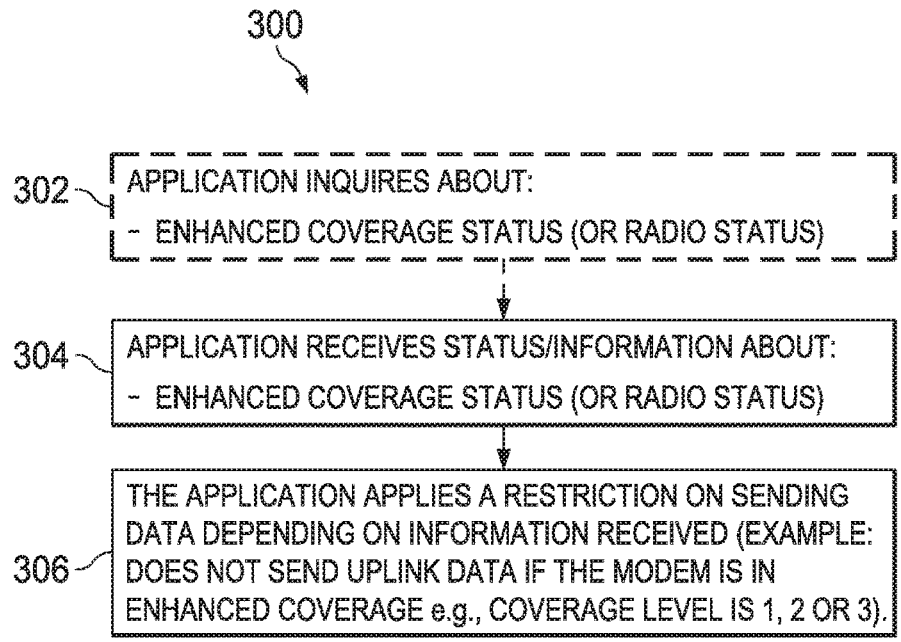
FIG. 3 is a flowchart illustrating a first example method for solution 1 of controlling data transmission in enhanced coverage states according to some implementations.

FIG. 3 is a flowchart illustrating a first example method 300 for solution 1 of controlling data transmission in enhanced coverage states according to some implementations. The method 300 starts at block 302, where the application inquires the modem, e.g., using an AT command, for information of the enhanced coverage level or radio coverage condition. As discussed above, block 302 is optional if the application subscribes or registers to the modem 204 for receiving unsolicited responses of coverage level change or radio coverage condition change. At block 304, the application receives information of the enhanced coverage level or radio coverage condition. At block 306, based on the received information, the application applies a restriction on sending uplink data. For example, the application can decide not to send uplink data if the modem/device is in enhanced coverage level 1, 2, or 3.

FIGS. 14A-14C show an example description of an AT command to enable solution 1 according to some implementations. Code-points can be introduced in one AT command from modem to application, in order to notify the application of the radio coverage condition every time the radio coverage condition changes (i.e., unsolicited information). FIGS. 14A-14C show an example change to 3GPP TS 27.007 (changes are underlined) to introduce radio coverage information in the AT command Network registration +CREG. Other AT commands could be used instead or in addition, for example PLMN selection +COPS, GPRS network registration status +CGREG and/or EPS network registration status +CEREG. New AT commands could also be created for this purpose. New fields <cov> and <cov-gsm> can be introduced in the AT command Network registration +CREG as shown in Table 2. Alternatively, <cov> and <cov-gsm> can be merged in a single field.

TABLE 2

+CREG parameter command syntax

| Command | Possible response(s) |
| --- | --- |
| +CREG=[<n>] | +CME ERROR: <err> |
| +CREG? | +CREG: <n>, <stat>[, [<lac>], [<ci>], [<AcT>][, <cause_type>, <reject_cause>], [<cov>], [<cov-gsm>]] |
| +CREG=? | +CREG: (list of supported <n>s) |

The fields <cov> and <cov-gsm> can include any radio coverage information. For example, 3GPP TS 27.007 can include the following description for the fields <cov> and <cov-gsm> for information of CE levels and coverage classes:

<cov>: integer type; coverage enhancement level. Applicable only if <Act>=E-UTRAN or

| 0 | Coverage Enhancement (CE) level 0 |
| --- | --- |
| 1 | Coverage Enhancement (CE) level 1 |
| 2 | Coverage Enhancement (CE) level 2 |
| 3 | Coverage Enhancement (CE) level 3 (not applicable if <Act> = NB-IoT) |

NOTE 7:
3GPP TS 36.331 specifies Coverage Enhancement levels.

<cov-gsm>: integer type; coverage class. Applicable only if <Act>=EC-GSM-IoT.

| 0 | Coverage Class CC1 |
| --- | --- |
| 1 | Coverage Class CC2 |
| 2 | Coverage Class CC3 |
| 3 | Coverage Class CC4 |
| 4 | Coverage Class CC5 |

NOTE 8:
3GPP TS 43.064 specifies Coverage Classes.

FIGS. 24A-24B show an example of a solicited AT command according to some implementations. For example, a new AT command can be introduced to allow the application to query the modem and the modem to reply with information of the radio coverage condition. FIGS. 24A-24B show an example change to 3GPP TS 27.007 (changes are underlined) to include the new AT command +CIOTQCEL.

Solution 2: Refraining from mobile-originated data transmission if the device is in enhanced coverage states: application instructs modem to transmit data conditionally.

Figure 4:
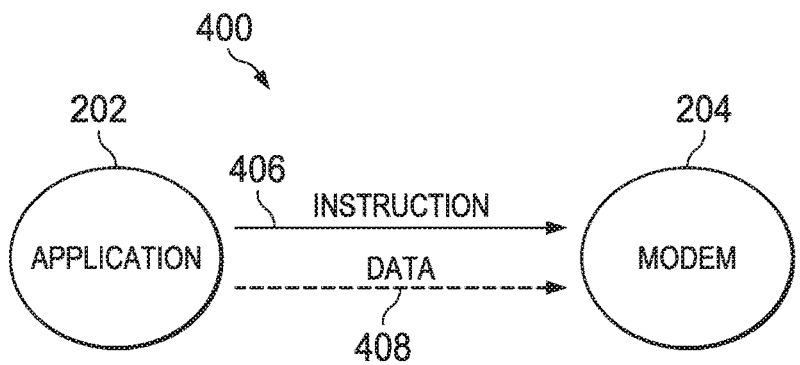
FIG. 4 is a flow diagram illustrating solution 2 for controlling data transmission in enhanced coverage states according to some implementations.

FIG. 4 is a flow diagram 400 illustrating solution 2 for controlling data transmission in enhanced coverage states according to some implementations. The flow diagram 400 includes an application 202 and a modem 204 at a device. The modem 204 has knowledge of the radio coverage condition for the device (e.g., the currently applicable CE mode/level or coverage class, radio signal strength or quality such as RSSI, RSCP, or RSRP, a number of repetitions for data transmission, or other radio link information). The application 202 can send an instruction 406 to the modem 204 to instruct the modem 204 to transmit data under certain conditions. The instruction 406 can include any conditions for transmission restrictions, and parameters associated with the conditions for transmission restrictions. For example, the application 202 may instruct the modem 204 not to send data if a device/modem CE level/mode or coverage class is one in a set of predefined CE levels/modes or coverage classes, if a number of data repetitions is above a predefined repetition threshold, a signal strength at the device is below a predefined signal strength threshold, or a signal quality at the device is below a predefined signal quality threshold. For instance, the application 202 can instruct the modem 204 not to send data if the modem/device is in enhanced coverage level 1, 2, or 3. In some implementations, the application 202 can also send data 408 to the modem 204 so that the modem 204 will apply transmission restrictions on the data 408. The instruction 406 and the data 408 can use AT commands or other APIs.

The application 202 can instruct the modem 204 to send specific uplink data when a device/modem CE level/mode or coverage class is not an element of a predefined set of enhanced coverage modes/levels or coverage classes, if a number of data repetitions is below a predefined repetition threshold, a signal strength at the device is above a predefined signal strength threshold, or a signal quality at the device is above a predefined signal quality threshold. Symmetrically, the application 202 can instruct the modem to not send specific uplink data when a device/modem CE level/ mode or coverage class is an element of a predefined set of enhanced coverage modes/levels or coverage classes, if a number of data repetitions is above a predefined repetition threshold, a signal strength at the device is below a predefined signal strength threshold, or a signal quality at the device is below a predefined signal quality threshold. The specific uplink data could be sent together with the instruction 406 (e.g., data is included in the instruction 406), or separately (e.g., separate instruction 406 and data 408). If data is sent separately from the instruction, data can be discriminated based on, e.g. bearer identity, packet data protocol (PDP) context, application identifier, socket number (that can discriminate an application), or destination address. The data 408 can be sent at the same time as the instruction 406, or at a later time. In some cases, the application can decide to send the data unconditionally after a number of attempts being made aware of the coverage conditions by the modem.

Alternatively, or in combination, the application 202 can instruct the modem 204 to send any uplink data when the device/modem is not in a specific enhanced coverage mode/level or a specific radio coverage condition. Symmetrically, the application 202 can instruct the modem 204 to not send any uplink data when the modem is in one or more specific enhanced coverage mode(s)/level(s) or a specific radio coverage condition. Similar to solution 1, data that is not sent can either be dropped or discarded.

Table 3 lists examples of instruction 406 from the application 202 to the modem 204. The second column of Table 3 shows whether or not the relevant uplink data is included with the instruction 406:

TABLE 3

Examples of instructions from application to modem

| Instruction from application to modem | Uplink data included with the instruction |
|---|---|
| Send any uplink data if the modem is not in enhanced coverage level 1, 2 or 3 | No |
| Send any uplink data if the modem is in enhanced coverage level 0 or 1 | No |
| Send uplink data attached with this instruction if the modem is in Coverage Class CC1 or CC2 (Other uplink data are sent without restriction) | Yes |
| Send uplink data attached with this instruction if the RSSI of the Serving Cell is above 3 dB (Other uplink data are sent without restriction) | Yes |
| Send uplink data related to socket port 0 if the modem is in enhanced coverage level 0 (Other uplink data are sent without restriction) | No |

Other conditions can also be used, for example, applying a transmission restriction for more stringent enhanced coverage modes/levels or coverage classes, such as enhanced coverage level 3.

Figure 5:
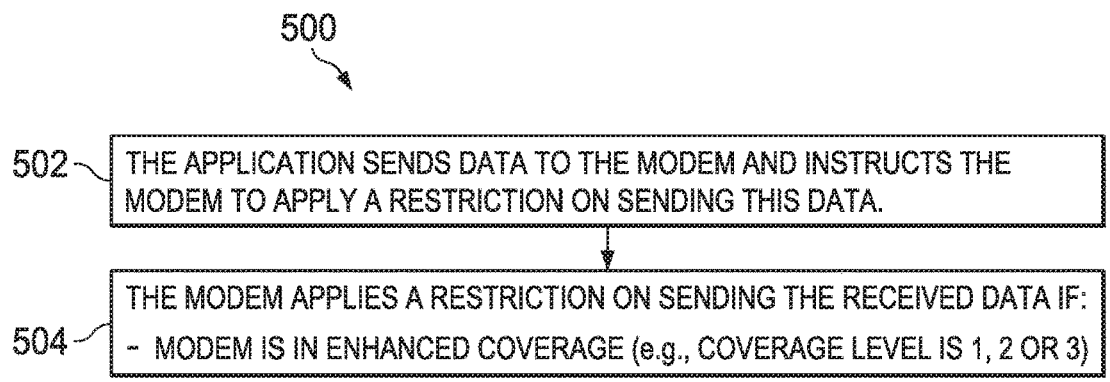
FIG. 5 is a flowchart illustrating a first example method for solution 2 of controlling data transmission in enhanced coverage states according to some implementations.

FIG. 5 is a flowchart illustrating a first example method 500 for solution 2 of controlling data transmission in enhanced coverage states according to some implementations. The method 500 starts at block 502, where the application sends specific data to the modem and instructs the modem to apply a restriction on sending this data according to the conditions specified in the instruction. At block 504, the modem applies a transmission restriction on the data according to the instruction. For example, the application can instruct the modem to apply a transmission restriction on the data if the modem/device is in enhanced coverage level 1, 2, or 3. Accordingly, the modem does not send the specific data if the modem/device is in enhanced coverage level 1, 2, or 3.

Figure 6:
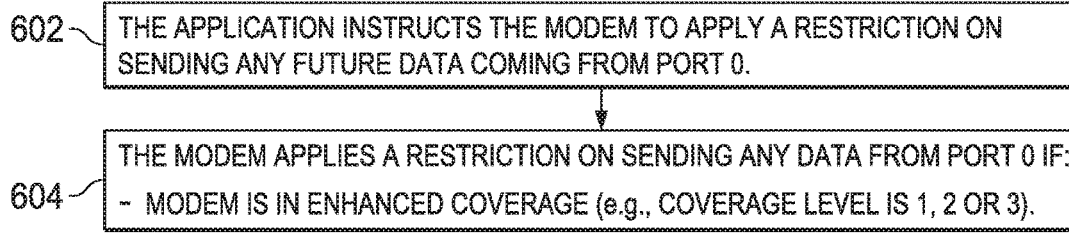
FIG. 6 is a flowchart illustrating a second example method for solution 2 of controlling data transmission in enhanced coverage states according to some implementations.

FIG. 6 is a flowchart illustrating a second example method 600 for solution 2 of controlling data transmission in enhanced coverage states according to some implementations. The method 600 starts at block 602, where the application instructs the modem to apply a restriction on sending any future data coming from port 0. At block 604, the modem applies a transmission restriction on the data from port 0 according to the instruction. For example, the application can instruct the modem to apply a transmission restriction on data from port 0 if the modem/device is in enhanced coverage level 1, 2, or 3. Accordingly, the modem does not send data from port 0 if the modem/device is in enhanced coverage level 1, 2, or 3.

FIGS. 15A-15B show a first example description of an AT command to enable solution 2 according to some implementations. FIGS. 15A-15B show an example change to 3GPP TS 27.007 (changes are underlined) to send an instruction and related data in an AT command. A new field <cond> can be introduced in the AT command +CSODCP as shown in Table 4. The application can include the instruction in the filed <cond> and the specific data in the field <cpdata>.

TABLE 4

+CSODCP action command syntax

| Command | Possible Response(s) |
|---|---|
| +CSODCP=<cpdata_length>, <cpdata>[, <RAI>[, <type_of_user_data>, <cond>]] | +CME ERROR: <err> |
| +CSODCP=? | +CSODCP: (maximum number of bytes of the <cpdata_length>), (list of supported <type_of_user_data>s) |

The field <cond> can include any instruction. For example, 3GPP TS 27.007 can include the following description for the field <cond> if the instruction relates to CE levels/coverage classes:

<cond>: integer type. Indicates the condition for transmitting the user data.
  0 Transmit the data
  1 Transmit the data only if the device is not in Coverage Enhancement (CE) levels 1, 2, and 3 (E-UTRAN or NB-IoT)
     Transmit the data only if the device is not in Coverage Class 2, 3 and 4 (EC-GSM-IoT)
NOTE 7: 3GPP TS 36.331 specifies Coverage Enhancement levels. 3GPP TS 43.064 specifies Coverage Classes.

Alternatively, the field <cond> can include an instruction related to the maximum CE level or the highest coverage class in which the user data shall be transmitted. For example, 3GPP TS 27.007 can include the following description for the field <cond>: <cond>: integer type. Specifies the maximum Coverage Enhancement (CE) level 0 to 3 (E-UTRAN), 0 to 2 (NB-IoT) or the highest Coverage Class 1 to 5 (EC-GSM-IoT; CC1 to CC5, respectively) in which the user data shall be transmitted. If the CE level or the coverage class, as applicable, is above the value indicated, the user data shall not be transmitted.

As another alternative, 3GPP TS 27.007 can include the following description for the field <cond> if the instruction relates to CE levels/coverage classes and a predefined timer for transmission restrictions:

<cond>: integer type. Indicates the condition for transmitting the user data.
  0 Transmit the data
  1 Transmit the data only if:
  E-UTRAN or NB-IoT:
    The device is in Coverage Enhancement (CE) level 0; or
    The device is in Coverage Enhancement (CE) level 1, 2 or (applicable to E-UTRAN only) 3, and the data was not transmitted for the last hour.
  EC-GSM-IoT:
    The device is in Coverage Class CC1; or
    The device is in Coverage Class CC2, CC3, CC4 or (if applicable) CC5, and the data was not transmitted for the last hour.

Solutions 1 and 2 can be used when the device is in idle mode or connected mode, and can be used in conjunction at different times.

Additional or alternative condition for refraining from mobile-originated data transmission based on data type Alternatively, or in combination, data type can be used as a condition for transmission restrictions in solutions 1 and/or 2. For instance, some types of data are less critical from a system point of view than others. Examples of such type of data may be data specific to a given application or type of use (as more than one application on the device can use the same type of data for different purposes). Alternatively, some data may be time sensitive, and there is no value in sending them if the transmission has to be delayed (as the enhanced coverage functionality introduces further delays by using a large number of repeated transmissions). Therefore, the application could refrain from sending uplink data (e.g. one or more uplink message(s)) if the device is in an enhanced coverage state, with an additional condition based on data type.

For example, data related to device location may be a condition for refraining of sending uplink data, whereas data related to a flat tire issue would not be a condition for refraining of sending uplink data. Data related to emergency (e.g. emergency call information, imminent car-crash information, or emergency location information) would not be a condition for refraining of sending uplink data, while other uplink data would. In another example, data packets related to transmission control protocol (TCP)/Internet protocol (IP) could be refrained from being sent, while data packets related to constrained application protocol (COAP)/user data protocol (UDP)/IP could be sent. The reason is that TCP/IP might not work well with enhanced coverage due to additional delays. In some cases, the additional condition can relate to IP address and/or port number (socket), Access Point Name (APN), or protocol related information (e.g. evolved packet system (EPS) bearer for LTE or PDP context for 2G/3G, which discriminate the user plane session).

Other examples of different data types or sub-types that could trigger transmission restrictions can include (but not limited to): fleet management and logistics, automotive telematics, automation and monitoring, point of sales (PoS), security and surveillance, health monitoring (e.g., machine-to-machine healthcare gateway, wearable healthcare monitoring devices, or (wearable) wellness/fitness service devices), secure remote patient care and monitoring, wearables (e.g., video streaming, file sharing, or gaming), smart building (e.g., analytics, lighting, fire and life safety, or security and access), energy (e.g., wide area energy related measurement/control system for advanced transmission and distribution automation, analytics use case for machine-to machine such as initiate and stop collection, conditional collection, create/modify collection scheme, smart reader reading, environmental monitoring of remote locations to determine hydropower, and/or oil and gas pipeline cellular/satellite), enterprise (e.g., smart building such as building automation and control or analytics or lighting, fire and life safety/security and access, heating, ventilation, air conditioning, power and energy, and/or industrial systems), public service (e.g., street light automation, use case on devices, virtual devices and things, and/or car/bicycle sharing services), residential (e.g., home energy management, home energy management system, plug-in electrical charging vehicles and power feed in home scenario, real-time audio/video communication, event triggered task execution use case, and/or semantic home control), semantic device plug and play, agriculture (e.g., remote equipment monitoring, remote crop monitoring, climate monitoring and forecasting, predictive analytics for crops and livestock, livestock tracking and geofencing, statistics on livestock feeding and produce, smart logistics and warehousing, and/or drone monitoring and control), telematics (vehicle diagnostic and maintenance report and services, traffic accident information collection, stolen vehicle recovery, roadside assistance, in-car entertainment and internet access, vehicle navigation, usage-based insurance, lease, rental, and/or HP and share car management), transportation (e.g., fleet management service using digital tachograph), others (e.g., extending the machine-to-machine access and/or network using satellites, M2M data traffic management by underlying network operator, optimized M2M interworking with mobile networks, optimizing connectivity management parameters, optimizing mobility management parameters, sleepy node use case, use case on collection of M2M system data, leveraging broadcasting/multicasting capabilities of underlying networks, and/or leveraging service provisioning for equipment with built-in machine-to-machine device). Note that the device 102 can be devices using these example data types and use cases.

Alternatively, or in combination, quality of service (QoS) can be used as a condition for transmission restrictions in solutions 1 and 2. For example, if the device is in an enhanced coverage state, uplink data could be sent if the device is configured with one or more bearer that can cope with the delay caused by the repeated transmissions of the enhanced coverage functionality, or the one or more bearer that has a QoS associated with:
  Guaranteed Bit Rate (GBR);
  non-GBR (non-GBR might tolerate delays due to repeated transmissions); and/or
  certain QoS Class identifier(s) (QCI(s)), for example, QCIs reflecting a bearer that is interactive.
The above examples use LTE QoS terminology. Other terminologies are possible with the example of other RATs. For example, for 2G/3G systems, the condition could be that the QoS traffic class(es) for the active PDP context(s) is(are) conversational or streaming. Other possible criteria can be related to priority levels such as:
  'High priority' and/or 'normal priority' versus 'low priority' in the precedence class.
  'Priority 1' (highest) and/or 'Priority 2' versus 'priority 3' in the radio priority of the data bearer.

Figure 7:
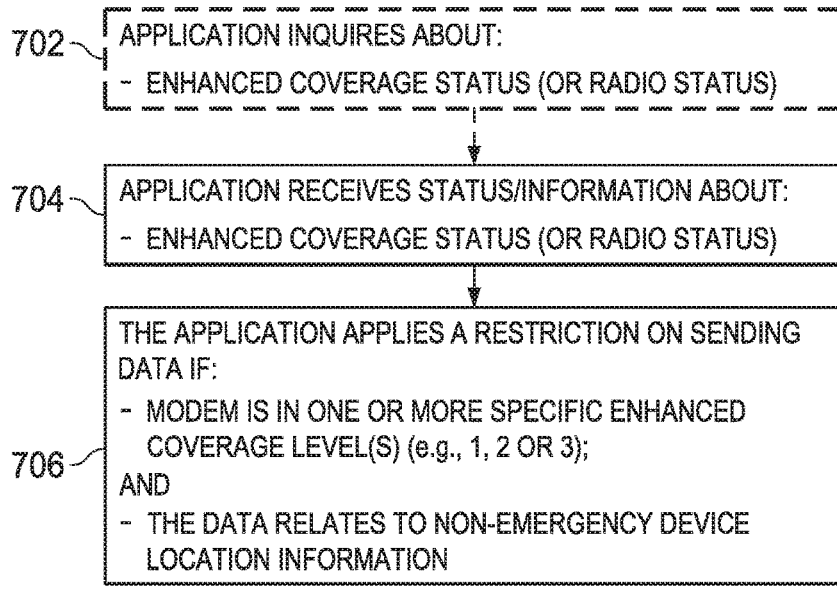
FIG. 7 is a flowchart illustrating a second example method for solution 1 of controlling data transmission in enhanced coverage states according to some implementations.

FIG. 7 is a flowchart illustrating a second example method 700 for solution 1 of controlling data transmission in enhanced coverage states according to some implementations. The method 700 starts at block 702, where the application inquires the modem, e.g., using an AT command, about the radio coverage condition. Block 702 is optional if the application subscribes or registers to the modem for receiving unsolicited responses of radio coverage condition change. At block 704, the application receives information of the radio coverage condition. At block 706, based on the received information, the application can apply a restriction on sending uplink data. For example, the application can decide not to send uplink data if the modem or device is in enhanced coverage level 1, 2, or 3 and the data relates to non-emergency device location information.

Figure 8:
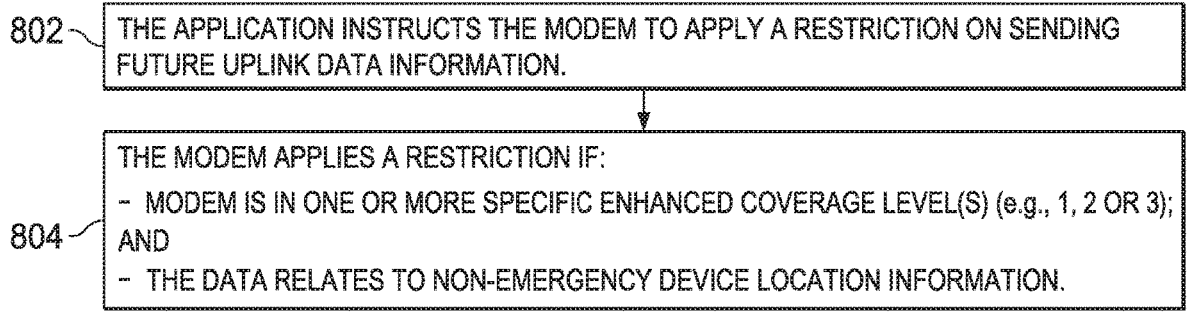
FIG. 8 is a flowchart illustrating a third example method for solution 2 of controlling data transmission in enhanced coverage states according to some implementations.

FIG. 8 is a flowchart illustrating a third example method 800 for solution 2 of controlling data transmission in enhanced coverage states according to some implementations. The method 800 starts at block 802, where the application instructs the modem to apply a restriction on sending future uplink data according to the conditions specified in the instruction. At block 804, the modem applies a restriction on uplink data transmission according to the instruction. For example, the application instructs the modem to apply a transmission restriction on uplink data if the modem/device is in enhanced coverage level 1, 2, or 3 and the data relates to non-emergency device location information. Accordingly, the modem does not send uplink data if the modem/device is in enhanced coverage level 1, 2, or 3 and the data relates to non-emergency device location information.

In some cases, different applications control different uplink data, and a scenario of different applications sending conflicting instructions is unlikely to happen. However, if this happens, some rules can be defined for the overall decision. For example:

the latest instruction received in time can apply for the modem; or some precedence control can be introduced within the instruction(s). For example, a number can be assigned to each instruction from the application to the modem. In case of conflict, the instruction with the highest number is applied. Some default values can be used.

some predefined rules can apply for the modem. For example, data sent by application(s) not using a transmission restriction with a set of conditions cannot be prevented to be sent by application(s) using the transmission restriction with the same set of conditions.

FIG. 16 shows a second example description of an AT command to enable solution 2 according to some implementations. A new AT command can be introduced from the application to the modem to carry the instruction where data is not sent together with the instruction. FIG. 16 show an example change to 3GPP TS 27.007 (changes are underlined) to include the new AT command +CEUDR. Table 5 shows the new AT command +CEUDR.

TABLE 5

| +CEUDR parameter command syntax | |
| --- | --- |
| Command | Possible response(s) |
| +CEUDR=[<setting>] +CEUDR? +CEUDR=? | +CEUDR: <setting> +CEUDR: (list of supported <setting>s) |

The new AT command +CEUDR can include any instruction. For example, 3GPP TS 27.007 can include the following description for the new AT command +CEUDR if the instruction relates to CE levels/coverage classes and a predefined timer for transmission restrictions:

Description

The set command is used to set the MT to operate according to uplink data restriction.

The read command returns the usage setting set by the TE.

The test command is used for requesting information on the supported MT setting(s).

Defined Values

<setting>: integer type; indicates the uplink data restriction for the MT. The default value is manufacturer specific.

0 uplink data for socket port 0 allowed to be sent 1 uplink data for socket port 0 allowed to be sent if:

E-UTRAN or NB-IoT:

The device is in Coverage Enhancement (CE) level 0; or

The device is in Coverage Enhancement (CE) level 1, 2 or (applicable to E-UTRAN only) 3, and the data was not transmitted for the last hour.

NOTE 1: 3GPP TS 36.331 specifies Coverage Enhancement levels.

EC-GSM-IoT:

The device is in Coverage Class CC1; or

The device is in Coverage Class CC2, CC3, CC4 or (if applicable) CC5, and the data was not transmitted for the last hour.

NOTE 2: 3GPP TS 43.064 specifies Coverage Classes.

Implementation

Optional.

Additional or alternative condition for refraining from mobile-originated data transmission based on wait time duration and/or number of attempts Alternatively, or in combination, the transmission restrictions in solutions 1 and 2 can be based on a time duration and/or a number of attempts exceeding a threshold. The threshold can be pre-defined, or configurable as discussed below. In other words, refraining from sending one or more specific message(s) or data would apply for a predefined time duration and/or a specific number of messages. For example, after the application has refrained from sending uplink message(s) due to the device is in an enhanced coverage state, it could revoke the refraining (i.e. send message(s) again) if messages have been prevented to be sent, e.g., for a time duration exceeding a predefined threshold. As another example, the application can instruct the modem to refrain from sending the data if the device is in an enhanced coverage state. After a certain wait time has expired, the application can send another instruction indicating that data will be sent unconditionally with respect to the radio coverage condition.

In some cases, if uplink messages are sent repetitively (e.g., periodically sending location information), the device can refrain from sending uplink messages for a specific number of messages or sending opportunities if the device is in an enhance coverage state (e.g., the device is in one or more specific enhanced coverage level(s)/mode(s)). After the specific number of uplink messages have been refrained from being sent or the specific number of sending opportunities have been refrained from being used, the device can send one uplink message even if the device is still in an enhanced coverage state and uses extra battery power for the uplink transmission. Depending on the application triggering the uplink messages, the data content that has not been sent can be sent later when the transmission restriction is revoked, or the data content can be dropped (e.g., location information that becomes obsolete after some time duration).

Additional or alternative condition for refraining from mobile-originated data transmission based on device location/speed As an additional or alternative condition for solutions 1 and 2, the application can refrain from sending one or more specific message(s) or data if the device is moving. For example, after the application (solution 1) or modem (solution 2) has held transmission of uplink data due to the device is in an enhanced coverage state, the transmission restriction can be revoked if the device stops moving, or stops moving during at least a certain duration. For example, in the case of sending location information, it can be useful for the network to know that the device has become stationary and in which location. Therefore, exception to the "not sending uplink data" can be made when the device becomes stationary, and uplink data (e.g. one message) can be sent even if it would use extra battery in an enhanced coverage state. In some cases, exception to the "not sending uplink data" can be made when the device has remained stationary for more than a certain time duration. In other words, the transmission restriction may not be revoked if the truck stops then restarts immediately, e.g., at a stop sign.

For another example, when the device is in an enhanced coverage state, it can be beneficial to allow the sending of uplink data (e.g., location or emergency information) if a lorry is entering a predefined area (e.g., based on location information from a location sensor such as GPS, or the Cell Identity, the Routing Area, or Tracking Area Identity of the device or any other identified geographical zone known by the network) associated with, for example, a dodgy area in a town. In other words, the device refrains from sending uplink messages if the device is in an enhanced coverage state and the device is not in a dodgy area. In some cases, when an application uses location information, it can be beneficial for the application server to know that the device has become stationary and at which location. The transmission restriction can be revoked when the device becomes stationary, and a limited amount of uplink data (e.g., one uplink message) can be sent even if it would use extra battery in enhanced coverage states. For example, after one uplink message has been sent, sending of uplink message(s) can be prevented again even though the device is still stationary.

In some cases, if the application knows that the device was in an enhanced coverage state beforehand (e.g., based on the last time that the application queried the modem), and if the application knows the device has not moved (e.g., via accelerometer reading), the application may not wake the modem up for assessing or inquiring the enhanced coverage modes/levels if a non-critical event occurs, because the application knows that the device is still in the enhanced coverage state. In other words, the application can refrain from querying the modem. Avoiding the modem assessing the enhanced coverage level can save further battery, because it avoids switching on some electronic components in the device/modem.

FIG. 9 is a second flow diagram 900 illustrating solution 1 for controlling data transmission in enhanced coverage states according to some implementations. The flow diagram 900 includes an application 202, a modem 204, and a location sensor or an accelerometer 902 at a device. The modem 204 has knowledge of the radio coverage condition for the device. The application 202 can send a query 206 to the modem 204 for information or status of the radio coverage condition and receive a status report 208 from the modem 204. The application 202 can also send a query 908 to the location sensor or the accelerometer 902 and receive a response 910 including location and/or speed information. Based on the status report 208 and the response 910, the application 202 determines whether to send uplink data or not. For example, the application 202 can decide not to transmit uplink data if the enhanced coverage level is 1, 2, or 3 and the device is moving. Note that the query/status interactions between the application 202 and the modem 204 and between the application 202 and the location sensor or accelerometer 902 can happen in any order (i.e., query the location sensor or accelerometer 902 first and then the modem 204, or the opposite), or simultaneously.

For solution 2, the modem itself may obtain device location/speed information and does not need to query a location sensor or accelerometer. For example, the modem can obtain the location/speed information by analyzing received GPS signals at the modem, analyzing received radio signals from base stations, or using radio cellular methods such as Cell Identity. In some implementations, as shown in FIG. 4, the application can send an instruction and related data to the modem, where the instruction could be "send this data (1) if the modem is not in an enhanced coverage state or (2) if the modem is in an enhanced coverage state and the device is not moving." After receiving the data and the instruction, based on the location/speed information the modem can apply the transmission restriction accordingly.

Additional or alternative condition for refraining from mobile-originated data transmission based on battery level An additional or alternative condition for solutions 1 and 2 can be based on battery level. For example, for solution 1, the application will refrain from sending specific uplink data in enhanced coverage states if the battery level is below a first threshold and/or is above a second threshold. Thresholds can be in percentage, e.g., 100% means the battery is completely full and 0% means the battery is not usable.

The reason for sending data (or data of a certain type/relevance) in an enhanced coverage state if the battery level is above a first threshold is that transmitting the corresponding data is beneficial from a system point of view and would not jeopardize the battery life (e.g., the battery level is deemed sufficient to last until it can be recharged/replaced). On the other hand, if the battery level is below the first threshold, it might be preferred to not send the corresponding data and keep the battery power for sending the most relevant or critical data.

The reason for sending data in an enhanced coverage state if the battery level is below a second threshold is that it might be preferred to use an eventual opportunity to send relevant/critical uplink data. For example, when the device battery is about to run out of power in a short timeframe, it might be preferable for the device to send a location message to the network, e.g., indicating that "I am located here and my battery is dying," while the location message would not be sent if the battery is above the second threshold.

FIG. 10 is a third flow diagram 1000 illustrating solution 1 for controlling data transmission in enhanced coverage states according to some implementations. The flow diagram 1000 includes an application 202, a modem 204, and an operating system, a device interface, or a battery sensor 1002 at a device. For example, the device interface can be a Man Machine Interface (MMI). The modem 204 has knowledge of the radio coverage condition for the device. The application 202 can send a query 206 to the modem 204 for information or status of the radio coverage condition and receive a status report 208 from the modem 204. The application 202 can also send a query 1008 to the operating system, the device interface, or the battery sensor 1002 and receive a response 1010 including information on the battery level or battery status. Based on the status report 208 and the response 1010, the application 202 determines whether to send uplink data or not. For example, the application 202 can decide not to transmit uplink data if the enhanced coverage level is 1, 2, or 3 and the battery level is below a first threshold and above a second threshold. Note that the query/status interactions between the application 202 and the modem 204 and between the application 202 and the operating system, device interface, or battery sensor 1002 can happen in any order (i.e., query the operating system, device interface, or battery sensor 1002 first and then the modem 204, or the opposite), or simultaneously.

For solution 2, the application can send an instruction and related data to the modem. For example, the instruction can be "send this data (1) if the modem is not in an enhanced coverage state or (2) if the modem is in an enhanced coverage state and the battery level is above 80% or below 5%." The modem can send a query to the operating system, device interface, or battery sensor for battery level information. Based on the battery level information from the operating system, device interface, or battery sensor and the instruction from the application, the modem will apply transmission restrictions accordingly.

The query to the operating system, device interface, or battery sensor can include one or more battery threshold. For example, the query can be "is the battery level below 5%" or "provide the battery level." The response from the operating system, device interface, or battery sensor can include status with respect to one or more battery threshold, e.g., whether the battery level is below a first threshold, or whether the battery level is above a second threshold. The response can also include absolute battery level, e.g., voltage, current, or electric charge (in Coulombs) level.

Additional or alternative condition for refraining from mobile-originated data transmission based on whether the device is plugged in a power supply An additional or alternative condition for solutions 1 and 2 can be based on whether the device is plugged in a power supply. For example, for solution 1, the application will refrain from sending uplink data in enhanced coverage states if the device is not plugged in an electricity power outlet. In other words, a device in an enhanced coverage state will send uplink data if the device is plugged in a power outlet where power consumption becomes less of an issue. Similar to querying the battery level, the application or the modem can query the operating system, device interface, or battery sensor whether the device is plugged in a power supply.

In some cases, the transmission restriction in enhanced coverage states can be applied based on a combination of radio coverage condition, data type, QoS, a predefined time period, a predefined number of attempts, device location/speed, battery level, and/or whether the device is plugged in a power supply.

Figure 11:
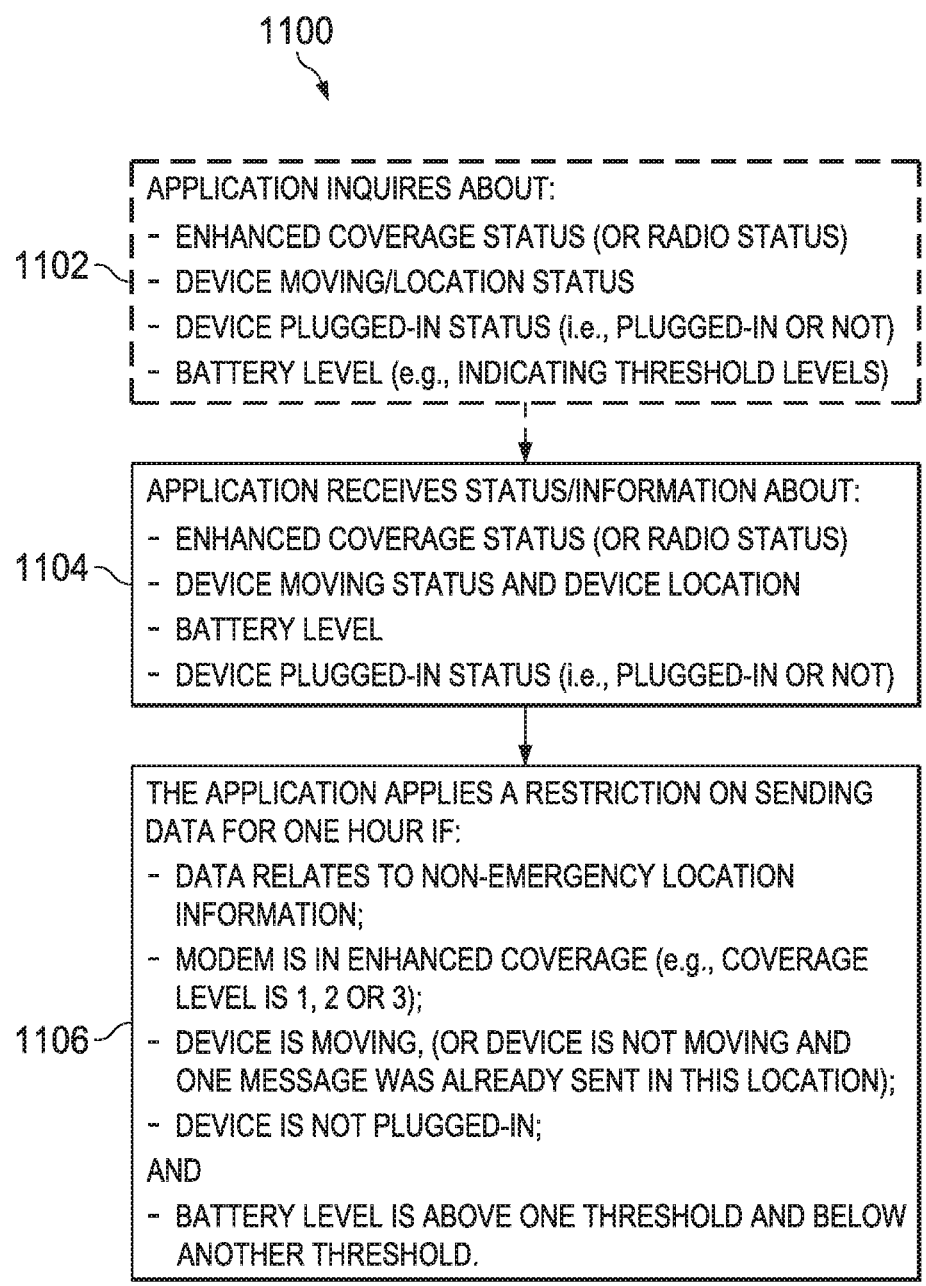
FIG. 11 is a flowchart illustrating a third example method for solution 1 of controlling data transmission in enhanced coverage states according to some implementations.

FIG. 11 is a flowchart illustrating a third example method 1100 for solution 1 of controlling data transmission in enhanced coverage states according to some implementations. The method 1100 applies transmission restrictions based on the radio coverage information, device speed information, battery level, whether the device is plugged in a power supply, and a predefined time period. The method 1100 starts at block 1102, where the application inquires the modem, e.g., using an AT command, about radio coverage condition, inquires the location sensor or accelerometer about the device's speed, and inquires the operating system, device interface, or battery sensor for the battery level and whether the device is plugged in a power supply. Block 1102 is optional if the application already has the information. At block 1104, the application receives information of the radio coverage condition, battery level, location/speed information, and whether the device is plugged in a power supply. At block 1106, based on the received information, the application applies a restriction on sending uplink data. For example, the application can decide not to send uplink data for one hour if the data relates to non-emergency location information, the modem or device is in enhanced coverage level 1, 2, or 3, the device is moving (or the device is not moving and one message has already been sent at the current location), the device is not plugged in a power supply, and the battery level is above one threshold and below another threshold.

Figure 12:
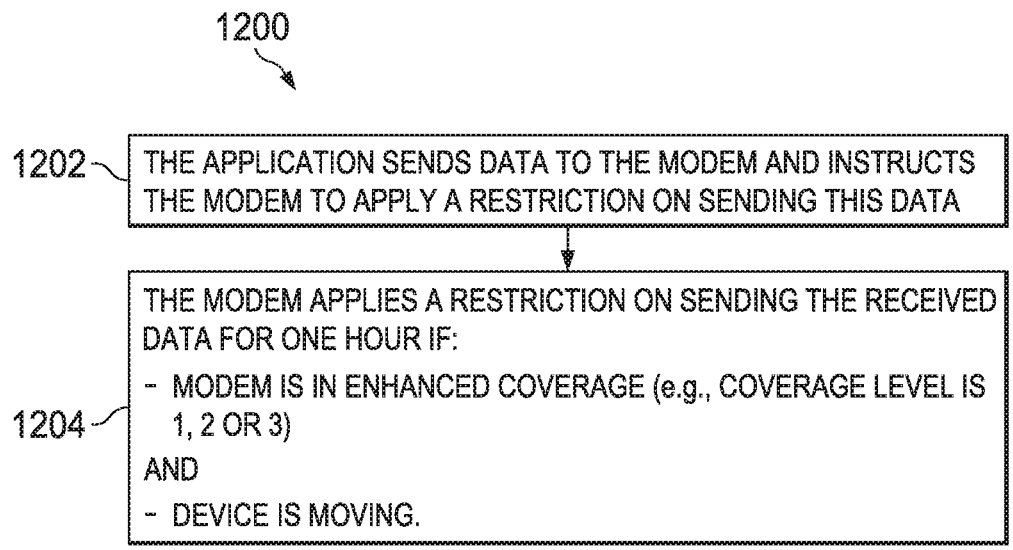
FIG. 12 is a flowchart illustrating a fourth example method for solution 2 of controlling data transmission in enhanced coverage states according to some implementations.

FIG. 12 is a flowchart illustrating a fourth example method 1200 for solution 2 of controlling data transmission in enhanced coverage states according to some implementations. The method 1200 applies transmission restrictions based on the radio coverage condition, device speed, and a predefined time period. The method 1200 starts at block 1202, where the application sends specific data to the modem and instructs the modem to apply a restriction on sending this data according to the conditions specified in the instruction. At block 1204, the modem applies a transmission restriction on the data according to the instruction. For example, the application can instruct the modem to apply a transmission restriction on the data for one hour if the device is in enhanced coverage level 1, 2, or 3 and the device is moving, and the modem will apply the transmission restriction accordingly.

Figure 13:
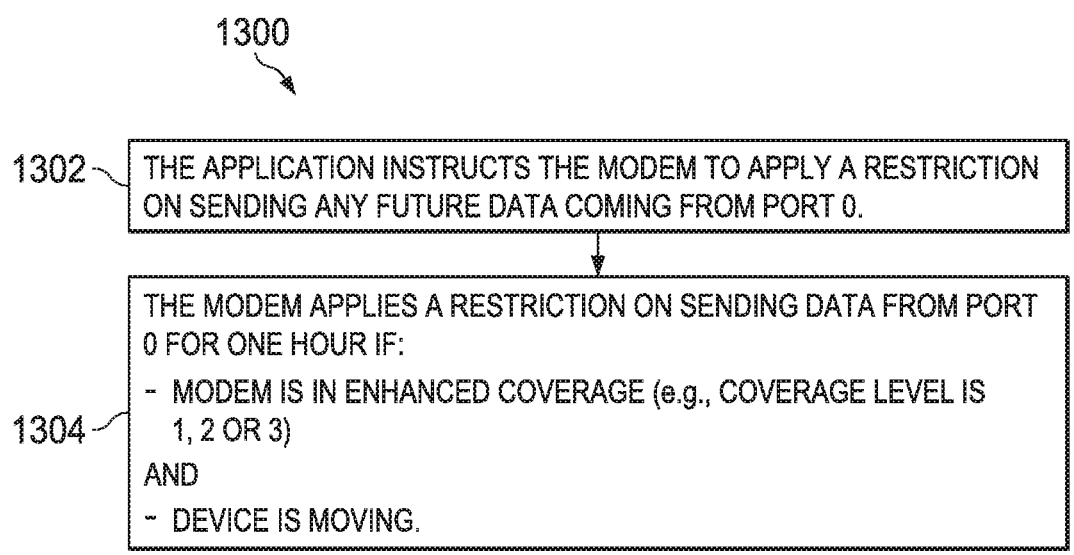
FIG. 13 is a flowchart illustrating a fifth example method for solution 2 of controlling data transmission in enhanced coverage states according to some implementations.

FIG. 13 is a flowchart illustrating a fifth example method 1300 for solution 2 of controlling data transmission in enhanced coverage states according to some implementations. The method 1200 applies transmission restrictions based on the radio coverage condition, device speed, and a predefined time period. The method 1300 starts at block 1302, where the application instructs the modem to apply a restriction on sending any future data coming from port 0. At block 1304, the modem applies a transmission restriction on the data from port 0 according to the instruction. For example, the application can instruct the modem to apply a transmission restriction on data from port 0 for one hour if the device is in enhanced coverage level 1, 2, or 3 and the device is moving, and the modem will apply the transmission restriction accordingly.

In some implementations, the device, the device upper layer, or an application in the device can be configured as to whether the transmission restriction in enhanced coverage states is allowed or not. If the transmission restriction is allowed, the device or the application can be further configured with parameters associated with the conditions of the transmission restriction. For example, the device or the application can be configured with parameters such as whether the transmission restriction is allowed or not, the time period for the transmission restriction, the data type impacted by the transmission restriction, battery levels associated with the transmission restriction, etc. In some implementations, the network can force the device to apply transmission restrictions.

Several methods can be used to configure the transmission restriction in solutions 1 and 2. The first method is to pre-define the configuration parameters in the device. For example, the configuration parameters can be pre-set by the device manufacturer or set by a user of the device through a user interface. In some cases, the device may also derive the conditions for transmission restrictions based on some signaling parameters from the network. As an example, the device can determine the conditions based on the QoS class of the traffic or the logical channel or the radio bearer to which the traffic belongs to, etc.

The second method is to specify the configuration parameters in industry standards so that the device operation will comply with the industry standards. For example, 3GPP standards can specify the conditions for transmission restrictions by including a sentence such as "Transmit uplink data only if the device is not in Coverage Enhancement (CE) levels 1, 2, and 3."

The third method is that the network sends configuration parameters to the device. Refraining from transmitting data until coverage improves may impact traffic QoS and as such, the network is responsible for ensuring a given QoS. Hence, it is possible that the network would like to control when a given set of conditions may be used for transmitting data belonging to a specific traffic (or QoS) class. For example, transmission restrictions can be applied for some QoS classes, but not for other QoS classes. In some cases, transmission restrictions can be applied for some applications, but not for other applications. The network may send the configuration parameters related to transmission restrictions in a downlink control message (or in a system information message) to the device (e.g., at Access Stratum level via point-to-point signaling or point-to-multipoint broadcast signaling, or a Non-Access Stratum message), so that the transmission restriction functionality at the device is controlled and configurable by the network. The network may also send the configuration parameters via the USIM application toolkit (USAT) application or Open Mobile Alliance (OMA) device management (DM). For example, the network can configure the following parameters for the device:

Take battery level into consideration for uplink data sending restriction (yes/no) (i.e., the network can configure the device whether or not to take battery level into consideration for uplink data transmission restrictions), Allow uplink data sending restriction if the battery is less than 90% charged (yes/no), Allow uplink data sending restriction if the battery is more than 10% charged (yes/no), Take into account whether the device is connected on main power for uplink data sending restriction (yes/no), Use predefined location area for uplink data sending restriction (yes/no), Use list of defined location areas for uplink data sending restriction (yes/no), Uplink data sending restriction is allowed (yes/no), Uplink data sending restriction allowed if the device is in enhanced coverage level 3 (yes/no), Uplink data sending restriction allowed if the device is in enhanced coverage level 2 or 3 (yes/no), Uplink data sending restriction allowed for a maximum of one hour (yes/no), Uplink data sending restriction allowed with maximum holding of a specific uplink data for three hours (yes/no), Uplink data sending restriction allowed for periodic location information reporting for a maximum of five messages (yes/no), Uplink data sending restriction allowed for traffic mapped to certain (indicated) traffic class (or QoS class or radio bearer/logical channel/logical channel group), Uplink data sending restrictions are not allowed (i.e. such data should be sent immediately regardless of other conditions) for certain (indicated) traffic class (or QoS class or radio bearer/logical channel/logical channel group), Maximum delay restrictions for a given traffic class.

As discussed above, the network can send configuration parameters related to transmission restrictions in a downlink control message. The downlink message could be at Non-Access Stratum (NAS) level, for example, using messages in LTE NAS Layer 3 protocol (see 3GPP TS 24.301) for LTE NB-IoT UEs. In some cases, the configuration parameters can be added in the Tracking Area Accept message or Attach Accept message from the network to the device. Alternatively, or in addition, the configuration parameters can be added in the Protocol Configuration Options (PCO) information element (IE) using the EPS bearer context activation procedure that involve downlink message coming from packet data network (PDN) Gateway or Service Capability Exposure Function (SCEF) within the network, towards the UE. Other procedures that involve downlink messages that carry the PCO IE and that could be used for including configuration parameters after enhancing the content of the PCO IE are the EPS bearer context deactivation procedure, EPS bearer context modification procedure, PDN connectivity reject procedure, bearer resource allocation reject procedure, and bearer resource modification reject procedure. Downlink messages such as Activate Default EPS Bearer Context Request message, Activate Dedicated EPS Bearer Context Request message, ESM Information Request message, and Modify EPS Bearer Context Request message can be used to include the configuration parameters for transmission restrictions. For GSM, messages in 3GPP TS 24.008 can be used instead (e.g. Routing Area Accept message, or Attach Accept message). The PCO IE can be used again as it is also sent in downlink GSM messages, e.g. Activate PDP Context Accept message, Activate Secondary PDP Context Reject message, Request PDP Context Activation message, Modify PDP Context Request message, Modify PDP Context Accept message, and Modify PDP Context Reject message.

FIG. 17 shows an example IE or field including configuration information for transmission restrictions according to some implementations. The IE or field 1700 can be included in a downlink message for sending transmission restriction configuration parameters to the device. For example, the IE or field 1700 can include the following description:
Data Sending Indication value
Uplink Data Restriction Allowed (UDRA)
Bits
2 1
0 0 No information available
0 1 Uplink data sending restriction not allowed
1 0 Uplink data sending restriction allowed for a maximum of one hour if the UE is in Enhanced coverage 1, 2 or 3
1 1 Uplink data sending restriction allowed for a maximum of two hours if the UE is in Enhanced coverage 1, 2 or 3

FIGS. 18A-18D show a first example description of including configuration parameters for transmission restrictions in an Attach Accept message according to some implementations. FIGS. 18A-18D show an example change to 3GPP TS 24.301 (changes are underlined), where the transmission restriction is applied based on radio coverage conditions and a predefined time period. For example, 3GPP TS 24.301 can include the following description (also shown in FIG. 18A):

If the ATTACH ACCEPT message includes the Data Sending Indication IE, this indicates to the UE if it is allowed to apply uplink data sending restriction and for which duration. 3GPP TS 24.301 can also include a new IE of data sending indication in Attach Accept message as shown in Table 6 (also shown in FIG. 18C).

TABLE 6 data sending indication IE in Attach Accept message

| IEI | Information Element | Type/ Reference | Presence | Format | Length |
|---|---|---|---|---|---|
| x- | Data sending indication | Data sending indication | O | TV | 1 |

3GPP TS 24.301 can include the description for the data sending indication IE as shown in FIGS. 18C-18D.

FIG. 19 shows a second example description of including configuration parameters for transmission restrictions in an Attach Accept message according to some implementations. FIG. 19 shows an example change to 3GPP TS 24.301 (changes are underlined), including the description for the IE Data Sending Indication discussed in FIGS. 18A-18D where the transmission restrictions can be applied based on radio coverage conditions, a predefined time period, battery level, whether the device is moving, and whether the device is plugged in a power supply.

FIGS. 20A-20H show an example description of including configuration parameters for transmission restrictions in an Activate Default EPS Bearer Context Request message according to some implementations. The IE Extended Protocol Configuration Options in the Activate Default EPS Bearer Context Request message (shown in FIG. 20C) from 3GPP TS 24.301 can be used to include the configuration parameters. Because the contents of the extended protocol configuration options are specified in 3GPP TS 24.008, FIGS. 20D-20H show an example change to 3GPP TS 24.008 (changes are underlined). For example, FIG. 20G shows that the configuration protocol can include a new parameter list "0017H (Uplink Data Restriction Indication)." FIGS. 20G-20H show an example description for the new parameter list of uplink data restriction indication, where the transmission restriction can be applied based on radio coverage condition, a predefined time period, battery level, whether the device is moving, and whether the device is plugged in a power supply.

Alternatively, or in combination, other downlink messages can be used for sending configuration parameters of transmission restrictions to the device. For example, messages at an Access Stratum level via point-to-point signaling or point-to-multipoint broadcast signaling. In some cases, when the device is in an RRC idle mode, SIB messages could be used to include the configuration parameters. Alternatively, or in addition, when the device is in an RRC Connected mode, messages such as the RRCConnectionSetup, RRCConnectionReconfiguration, or RRCConnectionResume message can be used to include the configuration parameters.

FIG. 21 shows an example RRC IE including configuration information of transmission restrictions according to some implementations. FIG. 21 shows an example change to 3GPP TS 36.331 (changes are underlined), where a new IE can be included. FIG. 21 shows an example description for the new IE UL-DataRestrictions, where the transmission restriction can be applied to certain logical channels based on a battery level and a predefined time period. The IE UL-DataRestrictions can be included in the following RRC IEs which can be included in RRC messages: radioResourceConfigDedicated, radioResourceConfigCommon, or SystemInformationBlockType2.

Alternatively, or in combination, the downlink message of a USAT application for Home Public Land Mobile Network (PLMN) can be used to send the configuration parameters of transmission restrictions. This can update files that are stored in the (U)SIM and specified in 3GPP TS 31.102. This can be used to configure the application or the device. Similar codings as shown in FIGS. 14A-21 and FIGS. 24A-24B can be used. Other messages, possibly applying to other systems than GSM/GPRS/LTE or other 3GPP systems, can be used. The network can instruct the device/application on the following aspects:

Whether to refrain transmitting uplink message is allowed or not.

Validity conditions as whether to refrain or not (time durations and/or number of messages used to decide to refrain). For example, the device may be configured to not transmit one or more uplink message(s) based on a number of repetitions threshold, that would compare to the number of repetitions configured by the network, e.g., for a specific channel.

Which QoS associated with uplink messages allows or not to send the uplink message.

Whether the additional condition of battery level shall apply or not. If this applies, what is the battery threshold to be used.

Figure 22:
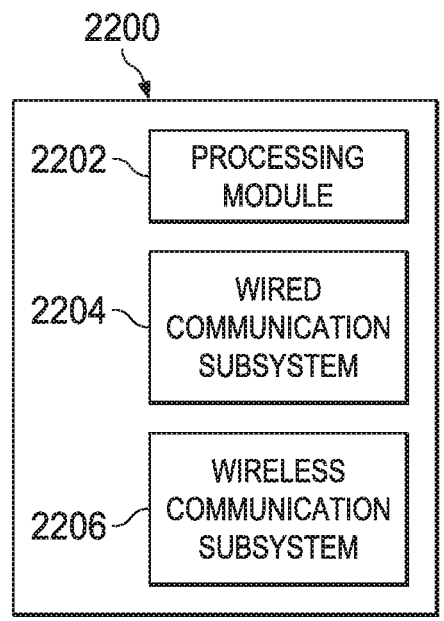
FIG. 22 is a schematic illustrating an example network node according to some implementations.

FIG. 22 is a schematic illustrating an example network node 2200 according to some implementations. The illustrated network node 2200 includes a processing module 2202, a wired communication subsystem 2204, and a wireless communication subsystem 2206. The wireless communication subsystem 2206 can receive data traffic and control traffic from devices. In some implementations, the wireless communication subsystem 2206 may include a receiver and a transmitter. The wired communication subsystem 2204 can be configured to transmit and receive control information between other access node devices via backhaul connections. The processing module 2202 can include one or more processing components (alternatively referred to as "processors" or "central processing units" (CPUs)) capable of executing instructions related to one or more of the processes, steps, or actions described above in connection with one or more of the implementations disclosed herein. The processing module 2202 can also include other auxiliary components, such as random access memory (RAM), read only memory (ROM), secondary storage (for example, a hard disk drive, flash memory or other non-transitory storage medium). The processing module 2202 can execute certain instructions and commands to provide wireless or wired communication, using the wired communication subsystem 2204 or a wireless communication subsystem 2206. Various other components can also be included in the network node 2200.

Figure 23:
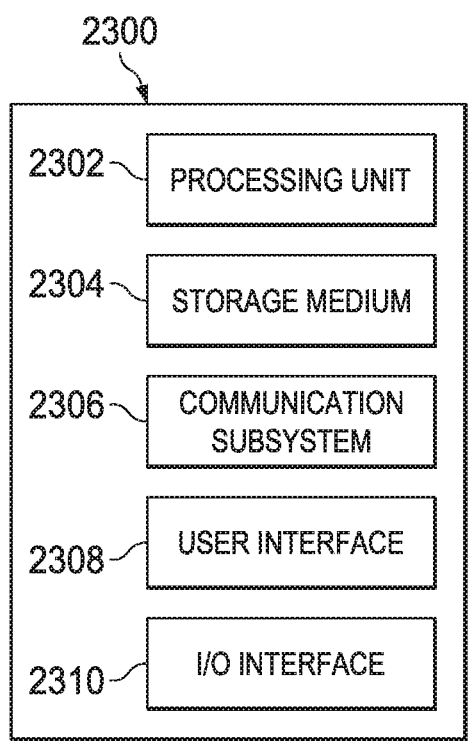
FIG. 23 is a schematic illustrating an example user equipment (UE) device according to some implementations.

FIG. 23 is a schematic illustrating an example UE device 2300 according to some implementations. The example device 2300 includes a processing unit 2302, a computer-readable storage medium 2304 (for example, ROM or flash memory), a wireless communication subsystem 2306, an interface 2308, and an I/O interface 2310. The processing unit 2302 can include one or more processing components (alternatively referred to as "processors" or "central processing units" (CPUs)) configured to execute instructions related to one or more of the processes, steps, or actions described above in connection with one or more of the implementations disclosed herein. The processing unit 2302 can also include other auxiliary components, such as random access memory (RAM) and read only memory (ROM). The computer-readable storage medium 2304 can be embodied by a non-transitory medium configured to store an operating system (OS) of the device 2300 and various other computer-executable software programs for performing one or more of the processes, steps, or actions described above.

The wireless communication subsystem 2306 may be configured to provide wireless communications for data information or control information provided by the processing unit 2302. The wireless communication subsystem 2306 can include, for example, one or more antennas, a receiver, a transmitter, a local oscillator, a mixer, and a digital signal processing (DSP) unit. In some implementations, the subsystem 2306 can support multiple input multiple output (MIMO) transmissions. In some implementations, the receivers in the wireless communication subsystems 2306 can be an advance receiver or a baseline receiver. Two receivers can be implemented with identical, similar, or different receiver processing algorithms.

The user interface 2308 can include, for example, one or more of a screen or touch screen (for example, a liquid crystal display (LCD), a light emitting display (LED), an organic light emitting display (OLED), a microelectromechanical system (MEMS) display), a keyboard or keypad, a trackball, a speaker, and a microphone. The I/O interface 2310 can include, for example, a universal serial bus (USB) interface. A skilled artisan will readily appreciate that various other components can also be included in the example device 2300.

It will be appreciated by those skilled in the art that a similar process could be applied for mobile terminated messages. In this case an application server or Services Capability Server (SCS) can receive information from the cellular network indicative of the radio coverage condition of a device. The application server or SCS can then use this information to determine whether or not to forward the mobile terminated message towards the cellular network, and can take into account similar criteria such as those listed for the uplink case. Criteria could for example include data type, QoS indicator, priority level, timer expiry, counter threshold, battery level and UE mobility. The application server or SCS could receive the radio coverage condition information from the network through a variety of means, for example it could query the network prior to sending each mobile terminated message or it could configure an event on the cellular network so that the application server or Services Capability Server is informed every time there is a change in the radio coverage condition, where in this latter case some hysteresis might also be applied in the reporting. These queries and event configurations could be achieved using signaling between the application server or Services Capability Server (SCS) and the Service Capability Exposure Function (SCEF) [3GPP TS 23.682]. The Service Capability Exposure Function could in turn determine information indicative of the radio coverage condition of the device from the mobility management entity (MME) via the T6a interface or from the serving GPRS support node (SGSN) via the T6b interface. The MME in turn could be informed of radio coverage condition from the BTS, Node B, or evolved Node B (eNB) or through signaling from the UE. Up to date information on radio coverage condition may only be available in the network when the UE has entered connected mode. During the periods where the UE is operating in idle mode, the cellular network may only be able to return a last known radio coverage condition, possibly along with a time stamp corresponding to when that information was acquired.

While operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be employed. Moreover, the separation of various system components in the implementation descried above should not be understood as requiring such separation in all implementations, and it should be understood that the described program components and systems can generally be integrated together in a signal software product or packaged into multiple software products.

Also, techniques, systems, subsystems, and methods described and illustrated in the various implementations as discrete or separate may be combined or integrated with other systems, modules, techniques, or methods. Other items shown or discussed as coupled or directly coupled or communicating with each other may be indirectly coupled or communicating through some interface, device, or intermediate component, whether electrically, mechanically, or otherwise. Other examples of changes, substitutions, and alterations are ascertainable by one skilled in the art and may be made.

While the above detailed description has shown, described, and pointed out the fundamental novel features of the disclosure as applied to various implementations, it will be understood that various omissions, substitutions, and changes in the form and details of the system illustrated may be made by those skilled in the art. In addition, the order of method steps is not implied by the order they appear in the claims.

The invention claimed is:

1. A method, comprising:
   receiving, by an application running on a user equipment (UE), information indicative of a radio coverage condition;
   based on the received information, determining that the UE is in a certain coverage state; and
   in response to the determining, controlling uplink data transmission, wherein the controlling uplink data transmission comprises refraining from sending uplink data when at least one of the following occurs:
   the UE is in one of a set of predefined coverage enhancement levels, coverage classes, or coverage enhancement modes, a data repetition indicator at the UE is above a predefined repetition threshold, a signal strength at the UE is below a predefined signal strength threshold, or a signal quality at the UE is below a predefined signal quality threshold;
   the uplink data has a predefined data type;
   the uplink data is associated with at least one of a predefined Quality of Service (QoS) indicator, a predefined priority level, or a predefined bit rate information;
   a predefined timer associated with the uplink data transmission has not expired;
   a counter associated with the uplink data transmission has reached a predefined counter threshold;
   the UE is moving;
   a battery level of the UE is higher than a first threshold;
   a battery level of the UE is lower than a second threshold; or the UE is not plugged into a power outlet.

2. The method of claim 1, wherein the received information comprises at least one of a coverage enhancement level, a coverage enhancement mode, a coverage class, a data repetition indicator, a signal strength, or a signal quality.

3. The method of claim 1, further comprises:
receiving speed information from a location sensor or an accelerometer of the UE; and
based on the speed information, determining whether the UE is moving.

4. The method of claim 2, wherein receiving speed information is responsive to a query sent by the application to the location sensor or the accelerometer.

5. The method of claim 1, further comprising:
receiving battery information from an operating system, a device interface, or a battery sensor of the UE; and
based on the battery information, determining whether the battery level of the UE is higher than the first threshold or lower than the second threshold, or whether the UE is plugged into a power outlet.

6. The method of claim 5, wherein receiving battery information is responsive to a query sent by the application to the operating system, the device interface, or the battery sensor.

7. The method of claim 1, further comprising:
receiving, at the UE and from a network node, configuration information including an indication that the UE is configured to control uplink data transmission and parameters associated with controlling the uplink data transmission.

8. The method of claim 1, wherein receiving information indicative of a radio coverage condition is responsive to a query sent by the application.

9. The method of claim 8, wherein the query for information indicative of a radio coverage condition is conveyed in a first attention (AT) command.

10. The method of claim 1, wherein the information indicative of a radio coverage condition is conveyed in a second AT command.

11. The method of claim 1, further comprising:
receiving information indicative of a radio coverage condition when the radio coverage condition changes.

12. A user equipment (UE), comprising:
a memory; and
at least one hardware processor communicatively coupled with the memory and configured to::
receive, by an application running on the UE, information indicative of a radio coverage condition;
based on the received information, determine that the UE is in a certain coverage state; and
in response to the determining, control uplink data transmission, wherein the controlling uplink data transmission comprises refraining from sending uplink data when at least one of the following occurs:
the UE is in one of a set of predefined coverage enhancement levels, coverage classes, or coverage enhancement modes, a data repetition indicator at the UE is above a predefined repetition threshold, a signal strength at the UE is below a predefined signal strength threshold, or a signal quality at the UE is below a predefined signal quality threshold;
the uplink data has a predefined data type;
the uplink data is associated with at least one of a predefined Quality of Service (QoS) indicator, a predefined priority level, or a predefined bit rate information;
a predefined timer associated with the uplink data transmission has not expired;
a counter associated with the uplink data transmission has reached a predefined counter threshold;
the UE is moving;
a battery level of the UE is higher than a first threshold;
a battery level of the UE is lower than a second threshold; or the UE is not plugged into a power outlet.

13. The UE of claim 12, wherein the received information comprises at least one of a coverage enhancement level, a coverage enhancement mode, a coverage class, a data repetition indicator, a signal strength, or a signal quality.

14. The UE of claim 12, wherein the at least one hardware processor is further configured to:
receive speed information from a location sensor or an accelerometer of the UE; and
based on the speed information, determine whether the UE is moving.

15. The UE of claim 14, wherein the speed information is received in response to a query sent by the application to the location sensor or the accelerometer.

16. The UE of claim 12, wherein the at least one hardware processor is further configured to:
receive battery information from an operating system, a device interface, or a battery sensor of the UE; and
based on the battery information, determine whether the battery level of the UE is higher than the first threshold or lower than the second threshold, or whether the UE is plugged into a power outlet.

17. The UE of claim 12, wherein the at least one hardware processor is further configured to:
receive, at the UE and from a network node, configuration information including an indication that the UE is configured to control uplink data transmission and parameters associated with controlling the uplink data transmission.

18. The UE of claim 12, wherein the information indicative of a radio coverage condition is conveyed in a second AT command.

19. The UE of claim 12, wherein the at least one hardware processor is further configured to:
receive information indicative of a radio coverage condition when the radio coverage condition changes.

20. A tangible, non-transitory computer-readable medium containing instructions which, when executed, cause a user equipment (UE) to perform operations comprising:
receiving, by an application running on the UE, information indicative of a radio coverage condition;
based on the received information, determining that the UE is in a certain coverage state; and
in response to the determining, controlling uplink data transmission, wherein the controlling uplink data transmission comprises refraining from sending uplink data when at least one of the following occurs:
the UE is in one of a set of predefined coverage enhancement levels, coverage classes, or coverage enhancement modes, a data repetition indicator at the UE is above a predefined repetition threshold, a signal strength at the UE is below a predefined signal strength threshold, or a signal quality at the UE is below a predefined signal quality threshold;
the uplink data has a predefined data type;
the uplink data is associated with at least one of a predefined Quality of Service (QoS) indicator, a predefined priority level, or a predefined bit rate information;
a predefined timer associated with the uplink data transmission has not expired;

a counter associated with the uplink data transmission has reached a predefined counter threshold;
the UE is moving;
a battery level of the UE is higher than a first threshold;
a battery level of the UE is lower than a second threshold; or the UE is not plugged into a power outlet.

* * * * *